United States Patent [19]
Cafarella et al.

[11] Patent Number: 5,809,060
[45] Date of Patent: Sep. 15, 1998

[54] HIGH-DATA-RATE WIRELESS LOCAL-AREA NETWORK

[75] Inventors: John H. Cafarella, Swampscott; Jeffrey H. Fischer, Boston, both of Mass.

[73] Assignee: Micrilor, Inc., Wakefield, Mass.

[21] Appl. No.: 369,778

[22] Filed: Dec. 30, 1994

Related U.S. Application Data

[63] Continuation-in-part of Ser. No. 198,138, Feb. 17, 1994, abandoned.

[51] Int. Cl.$^6$ .................................................. H04B 14/707
[52] U.S. Cl. ............................................................ 375/206
[58] Field of Search ...................... 375/200, 205, 375/206, 207, 208, 209, 210, 279, 280, 281, 308, 330, 331; 370/18

[56] References Cited

U.S. PATENT DOCUMENTS

| | | | |
|---|---|---|---|
| 4,494,238 | 1/1985 | Groth, Jr. ..................... | 375/1 |
| 4,550,414 | 10/1985 | Guinon et al. ............... | 375/1 |
| 4,635,221 | 1/1987 | Kerr .............................. | 364/821 |
| 4,872,182 | 10/1989 | McRae et al. ................ | 375/1 |
| 5,001,723 | 3/1991 | Kerr .............................. | 375/1 |
| 5,093,841 | 3/1992 | Vancraeynest ............... | 375/200 |
| 5,103,459 | 4/1992 | Gilhousen et al. ........... | 375/1 |
| 5,111,478 | 5/1992 | McDonald ..................... | 375/200 |
| 5,309,474 | 5/1994 | Gilhousen et al. ........... | 375/1 |
| 5,414,730 | 5/1995 | Landquist et al. ............ | 375/208 |
| 5,511,073 | 4/1996 | Padovanni et al. ........... | 375/206 X |

*Primary Examiner*—Stephen Chin
*Assistant Examiner*—Kevin Kim
*Attorney, Agent, or Firm*—Lappin & Kusmer LLP

[57] ABSTRACT

An apparatus and method for communicating data between at least two data devices, suitable for use as a wireless local-area network, that provides robust data communication via a radio communications channel corrupted by multipath interference, particularly at high data rates. A preferred embodiment of the invention represents data as a sequence of Walsh-function waveforms encoded by pseudo-noise direct-sequence spread-spectrum modulation. Walsh-function-encoding of the data provides a long symbol duration, thereby allowing the spread-spectrum modulation to provide processing gain sufficient to substantially overcome multipath interference, while providing a high data rate. In another preferred embodiment, Walsh-function modulation is supplemented with various forms of phase modulation, such as coherent PSK for bi-orthogonal signalling, and DPSK between orthogonal symbols for non-coherent bi-orthogonal signalling, thereby further increasing data rate without reducing processing gain. In another preferred embodiment, Walsh-function modulation is supplemented with spectral shaping to allow increased bandwidth occupancy, thereby further increasing the processing gain without sacrificing data rate.

57 Claims, 16 Drawing Sheets

REQUIRES FAST SYNCHRONIZER ?

|  | MESSAGE-SWITCHED | PACKET-SWITCHED | |
|---|---|---|---|
|  |  | LONG | SHORT |
| TIME-SLOTTED | NO | NO | NO |
| RANDOM | NO | NO | YES |

HIGH-DATA-RATE WIRELESS LOCAL-AREA NETWORK

RELATED APPLICATION

This application is a continuation-in-part application of U.S. Ser. No. 08/198,138 filed by John H. Cafarella and Jeffrey H. Fischer on Feb. 17, 1994, now abandoned.

FIELD OF THE INVENTION

This invention relates generally to wireless local-area networks, and more particularly to wireless local-area networks for use in high-data-rate applications subject to multipath interference.

BACKGROUND OF THE INVENTION

Computer communications networks for allowing computers to communicate data to and from other computers have become common. For example, a user of a first computer can send and receive files and real-time data to and from a second computer. A local-area network (LAN) is a computer communications network which provides computer communications among a plurality of computers situated within a common locale. For example, a LAN is typically used to interconnect personal computers or workstations within an office or school building, or to interconnect computers situated in several buildings of a campus or office park. The computers connected to the LAN typically communicate among one another, and usually also communicate with one or more centralized or specialized computers, such as a host computer, with an output device, such as a printer, and with a mass data storage device, such as a file server.

A computer communications network, such as a LAN, employs a transmission medium to communicate data signals among the plurality of data devices in the network. Usually, the transmission medium is a network of wires. Wires can be cumbersome in that they can present routing problems, occupy space, require installation time, and inhibit the mobility of the computers connected to the network.

To overcome the problems associated with using a system of wires as the transmission medium, a plurality of radio transceivers can be used to communicate radio signals for carrying data messages among the computers in the computer communications network. Use of radio transceivers has gained little acceptance so far due to low data transmission rates and/or unreliability. Typically, if the data transmission rate is lowered, the reliability can be improved. Alternatively, high data transmission rates can be achieved, albeit with reduced reliability.

The principle barrier to high data rate communications between computers in a wireless local-area network is an interference phenomenon called "multipath". A radio signal commonly traverses many paths as it travels towards a receiver. Multiple propagation paths can be caused by reflections from surfaces in the environment, for example. Some of these paths are longer than others. Therefore, since each version of the signal travels at the same speed, some versions of the signal will arrive after other versions of the signal. Sometimes the delayed signals will interfere with more prompt signals as the delayed signals arrive at the receiver, causing signal degradation.

Multipath time-delay spread is the time that elapses between the moment that the earliest version of a transmitted signal arrives at a receiver, and the moment that the latest version of the signal arrives at the receiver.

To understand multipath effects and the instant invention, it is helpful to discuss the term "symbol". One or more symbols can be combined to form a message that conveys meaning. Each symbol must be uniquely recognizable, and is selected from a set of possible symbols, referred to as a symbol alphabet. The number of symbols in the symbol alphabet is referred to as the "order" of the symbol alphabet. For example, the letters "a", "b", and "c" are symbols from the English alphabet, where the order of the English alphabet is 26. The numbers "0" and "1" are symbols of the binary number system, which is of order 2.

It is possible to represent a sequence of symbols from a first alphabet with a symbol from a second alphabet, such as representing the binary symbol sequence "101" by the symbol "a". This binary symbol sequence consists of three binary symbols. Since each binary symbol can be either one of two possible symbols, in a sequence of three binary symbols, there are eight possible unique binary symbol sequences. Thus, an alphabet of order eight is required to represent the eight possible unique binary symbol sequences of three symbols each. In general, an alphabet of order $M=2^N$ is required to represent the $M=2^N$ possible unique binary symbol sequences of N symbols each.

Just as binary signalling can be referred to as 2-ary signalling, a signalling system that represents three-element binary symbol sequences using a symbol alphabet of order eight is referred to as 8-ary signalling. In the terminology of communications system design, an 8-ary symbolic representation is said to represent each symbol using "3 bits per symbol".

In general, a signaling system that represents an N-element binary symbol sequence using a symbol alphabet of order $M=2^N$ is referred to as M-ary signalling. In M-ary signalling, the equivalent binary data rate R is the symbol rate S multiplied by the number of bits per symbol N, i.e., $R=S * N$. The number of bits per symbol N is $\log_2 M$. Thus, for 8-ary signalling, N=3, and therefore the equivalent binary data rate is three times the symbol rate (assuming no error correction coding and no overhead bits).

In binary signalling, the equivalent binary data rate is equal to the symbol rate, i.e, R=S, because when M=2, the number of bits per symbol N is one. Consequently, "bit" and "symbol" are often used interchangeably in discussions of binary signalling.

In radio communications, a transmitter includes a modulator that provides a transmitted signal representative of information presented to the modulator. Conversely, a receiver includes a demodulator that receives the transmitted signal and ideally provides the original information represented by the transmitted signal. Commonly, the information presented to the modulator includes a plurality of symbols, where each symbol is selected from a finite set of symbols. For each symbol presented to the modulator, the modulator generates a corresponding symbol waveform selected from a set of discrete symbol waveforms, the symbol waveform then being transmitted over a communications channel to be received by at least one receiver.

Each symbol waveform that is transmitted is subject to distortion and noise, thereby making each received symbol waveform differ from the corresponding original transmitted symbol waveform, and become more similar to other symbol waveforms that were not actually transmitted. Consequently, it is necessary to decide which symbol of the discrete set of known symbols was most likely transmitted. This decision is performed in the demodulator of the receiver, the output of the demodulator being a sequence of symbols, selected from the known set of symbols, that represents the best estimation of the transmitted symbol sequence.

To decide which symbol sequence has been transmitted, for each transmitted symbol, the demodulator processes the corresponding received symbol waveform for a period of time called a coherent integration interval. It is essential that each coherent integration interval be coincident with each received symbol waveform, thereby providing correct synchronization. In the absence of correct synchronization, the symbol content of the received waveform will be misinterpreted.

To further clarify the concept of multipath interference, consider the case of a message transmitted as a binary data modulation waveform, wherein each message symbol consists of a single bit. When the multipath time-delay spread is longer than the duration of a symbol waveform, symbol waveforms of the first version of the received signal overlap non-corresponding symbol waveforms of the excessively delayed versions of the received signal. This phenomena is called intersymbol interference (ISI).

For example, in a typical indoor or campus radio network environment, the time-delay spread can be greater than 500 nanoseconds (ns). Since in binary data modulation, data rate is the multiplicative inverse (reciprocal) of symbol duration, a time-delay spread of 500 ns implies that data rates even much less than two million bits per second (Mbps) will result in significant data errors due to intersymbol interference.

In addition to intersymbol interference, some multipath reflections may exhibit time-delay spreads that are less than the duration of a symbol waveform. This form of multipath interference is referred to as intrasymbol interference, and such interference can cause a significant degradation in the amplitude of the total received signal.

In intrasymbol interference, the multipath time-delay spread is shorter than the duration of a symbol waveform. Thus, symbol waveforms of the first received signal version overlap non-corresponding portions of corresponding symbol waveforms of the delayed versions of the received signal. Consequently, reflected signals of significant amplitude will cause periodic amplitude nulls in the frequency spectrum of the total received signal due to coherent cancellation at particular frequencies. The bandwidth of the amplitude nulls is inversely proportional to the delay of the corresponding signal that is causing the interference. This phenomenon is known as "frequency selective fading", and it substantially impairs the reliability of communication between a transmitter and a receiver.

Overcoming frequency selective fading is commonly accomplished using diversity methods. These methods include spatial diversity, polarization diversity, and frequency diversity. Spatial and polarization diversity require at least two receivers, each having a separate receive antenna, such that the frequency selectivity pattern is different for each antenna.

Frequency diversity receivers can share a single broadband receive antenna, but the transmitted signal is duplicated and is transmitted on at least two carrier signals that are separated by a frequency bandwidth that is larger than the width of a frequency null. A frequency diversity receiver unit consists of multiple receivers, each tuned to a different carrier frequency. The receiver outputs of either method fade independently, and are combined in one of several known ways to take advantage of this. Since this method employs an independent receiver for each diversity channel used, it can be quite costly to implement.

There are known methods for reducing intersymbol interference due to multipath effects while preserving high data rates. A first method employs highly directional line-of-sight microwave links with high antenna gain, since signals having the longest delays often arrive at angles far from the central axis of the microwave antenna. One problem with this method is that to obtain high antenna gain, the antennas must be large, mounted on fixed platforms, and must be carefully pointed. Such antennas are therefore complicated and expensive to install and move. Large antennas are particularly unsuitable for short range indoor or campus environments.

A second method for reducing intersymbol interference due to multipath effects while preserving high data rates is to use echo canceling techniques implemented using adaptive filters. However, the expense and computational requirements of adaptive filters is prohibitive at the high data rates required in the highly dynamic environment of radio communications.

A third method is to channelize the transmitted waveform into multiple channels, each channel being of different carrier frequency and of lower bandwidth (therefore using longer symbol durations) than the single-channel transmitted waveform. Each channel is then received independently. This approach is excessively costly because one independent receiver per channel is required.

A fourth and less conventional approach is to use M-ary orthogonal signalling, with symbols that are $\log_2 M$ times as long as the binary symbols would be. According to the property of orthogonality, the waveform that represents each symbol has no projection on the respective waveform of any other symbol of the symbol alphabet from which the symbols of the message are selected. Consequently, each symbol in the alphabet is more easily distinguished from other symbols in the alphabet than without the orthogonality property.

If the temporal symbol duration of the orthogonal signal is made much longer than the multipath time delay spread, the effect of the multipath can be reduced. For example, one of many approaches includes the use of M-ary frequency shift keying (MFSK) modulation to encode the high-order symbol alphabet into one of M frequencies. Orthogonal signaling would still require a diversity receiver to overcome intrasymbol interference. Furthermore, orthogonal signalling requires excessive bandwidth to implement as compared with a conventional communications channel, and is therefore typically prohibited by government regulation.

All of these approaches for reducing intersymbol interference due to multipath effects while preserving high data rates must, in general, also include means for diversity reception to reduce the intrasymbol interference, and consequently must employ duplicate receivers.

Direct-sequence spread spectrum (DSSS) modulation is a multiplicative modulation technique that can be used for resolving and discriminating against multipath interference. A common but unsatisfactory approach to mitigating multipath effects is to employ direct-sequence spread spectrum modulation in conjunction with binary data modulation, where the direct-sequence spreading function of the DSSS modulation is a pseudonoise (PN) waveform. This approach is unsatisfactory because it cannot provide sufficiently high data rates to support LAN throughput requirements when sufficient processing gain is used for overcoming multipath effects.

The processing gain of a binary-data-modulated spread spectrum waveform is the ratio of the spreading bandwidth of the DSSS modulation to the data bandwidth. The spreading bandwidth is often limited due to constraints imposed by government regulation or by shortcomings of signal processing technology. Lowering the binary data rate increases processing gain and consequently robustness, but sacrifices rate of data throughput.

The ability to reduce both intersymbol and intrasymbol interference due to multipath effects depends on the processing gain of the spread spectrum waveform and receiver, whereas the ability to resolve adjacent paths is a function only of the spreading bandwidth, not of the symbol rate.

It is known to use Walsh-function waveforms to implement code division multiple access (CDMA). CDMA is used to improve the channel capacity of a spread spectrum system where multiple transmitters share the same frequency spectrum. Walsh-function modulation is used to provide separable signals. It is difficult to ensure this separability because of limited processing gain, and hence precise transmitter power regulation is usually required. Further improvements in gain would be desirable.

Gilhousen, U.S. Pat. No. 5,103,459, specifically teaches a cellular telephone system that employs spread spectrum encoding to discriminate among the signals of multiple users. This capability illustrates a well-known CDMA application of spread spectrum signalling. Reduction of multipath interference is not addressed. In the forward channel, Walsh-function signalling is used for improved CDMA performance, not for data modulation. Furthermore, Walsh-function signalling is not used to increase the CDMA processing gain by extending the symbol duration, but only to provide a better CDMA waveform than pseudo-noise DSSS would alone provide, because the treatment is such that the orthogonality property occurs between multiple users sharing the same frequency band, and not between data symbols. Although Gilhousen '459 discusses the use of Walsh-function data modulation in the reverse channel, Gilhousen '459 clearly states that the purpose of the Walsh-function signalling is to obtain good Gaussian noise performance in a Rayleigh fading multipath channel. Consequently, use of a modulation, such as binary phase shift keying, that requires a coherent phase reference signal for demodulation is precluded. Gilhousen '459 states that differential phase shift keying will not operate well in a Rayleigh fading multipath environment, and some means of orthogonal signalling is required to overcome the lack of a phase reference. Moreover, since the multipath channel discussed in Gilhousen '459 is Rayleigh fading, Gilhousen '459 does not resolve and discriminate against multipath interference. Further, the use in Gilhousen '459 of Walsh-function signalling for data modulation is independent of the use therein of spread spectrum encoding. Gilhousen '459 explicitly states that binary orthogonal signalling also works, since a coherent phase reference would not be required. The receiver described in Gilhousen '459 requires that the entire forward and backward channel be utilized to time-synchronize the mobile units. In fact, a satellite-based timing system is required to keep time aligned between cells. Therefore, the system disclosed by Gilhousen '459 is clearly a time-synchronous CDMA cellular telephone communications system, and is not intended for, or useable as, a high data-rate radio-frequency inter-computer communications system.

Kerr, U.S. Pat. Nos. 4,635,221 and 5,001,723, describes a system that utilizes the bandwidth available in a surface-acoustic-wave convolver, which generally has a much higher processing bandwidth than the bandwidth available for signal transmission. A received signal is multiplexed onto several carrier frequencies, and each is processed independently in the convolver. The convolver is used to simultaneously compare the received signal to M orthogonal reference waveforms, composed of Walsh function and PN-DSSS waveforms. The '723 patent describes a variation that uses orthogonal sinusoids instead of Walsh functions, as taught by the '221 patent. The scope of the teachings of these patents is narrow in that they specifically address a method of demodulating a plurality of signals using a convolver, and do not disclose any means for implementing a high-data-rate wireless local-area-network suited for use in a multipath environment.

Groth, U.S. Pat. No. 4,494,238, discloses use of pseudo-noise direct-sequence spread spectrum across multiple, non-contiguous carrier frequencies that are coherently processed at a receiver. Walsh functions are used in this system to generate signals within the receiver, such signals being used to perform phase computations, but not for signaling over a communications channel corrupted by multipath interference.

McRae et al., U.S. Pat. No. 4,872,182, provides a method for determining a useful frequency band for operating a high frequency radio communications network. Each receiver is identified by its pseudonoise direct-sequence spread spectrum reference code, which implies that spread spectrum encoding is used for CDMA purposes, even though the term "CDMA" is not explicitly mentioned. Walsh-function modulation is used to specify control information for scanning available frequency bands until a useful frequency band is found.

OBJECTS OF THE INVENTION

It is a general object of the present invention to provide a wireless LAN of the type described that overcomes the problems of the prior art.

More specific objects of the present invention include providing a wireless LAN that achieves superior data rates while providing reliable communications.

Another object of the invention is to overcome intersymbol and intrasymbol interference resulting from multipath effects, and to thereby provide a higher data rate with more robust performance than previously possible.

Another object of the invention is to provide a practical means for implementing a high-reliability, high-data-rate, wireless local-area network.

SUMMARY OF THE INVENTION

The invention provides an apparatus and method for providing high data rates in a wireless local-area network data communications environment, even in the presence of multipath interference. To achieve this, the invention combines a higher-order signaling alphabet, such as an orthogonal signal set, with direct-sequence spread-spectrum modulation (DSSS) to provide processing gain for suppressing both intra-symbol and inter-symbol interference due to multipath effects, while also providing the high rates of data throughput required of a wireless LAN. Furthermore, the use of DSSS in this high data rate application reduces intrasymbol interference effects to the extent that the need for diversity methods is significantly diminished.

Use of a higher-order signalling alphabet results in a symbol waveform that is $\log_2 M$ times longer than an equivalent binary signalling waveform, where M is the order of the higher-order signalling alphabet. The longer-duration symbol waveforms of the higher-order signalling alphabet are co-modulated with a DSSS waveform so as to provide increased processing gain for a given data rate, without increasing the spread spectrum transmission bandwidth. The increased processing gain results in robust performance at a data rate that is sufficiently high to provide a practical wireless LAN.

For some applications, the use of a non-orthogonal high-order signalling alphabet results in acceptable performance, as measured by a low bit-error rate for a given signal-to-noise ratio. Examples of non-orthogonal symbol sets include quadrature amplitude modulation (QAM) signal constellations, and M-ary phase shift keying sets, when transmitting more than two bits per symbol.

In a preferred embodiment, the higher-order alphabet that is used is mutually orthogonal. The use of M-ary orthogonal signaling to implement the higher-order alphabet is normally prohibited by the narrowband channel allocations available; to convey n bits per symbol, the bandwidth required is M times the symbol rate, where the value of M is $2^n$. The fine structure (high frequency components) required to support M orthogonal waveforms, as expressed by the exponential relationship between n and M, leads to exponentially increasing bandwidth requirements. For example, for a given symbol rate, increasing the number of bits transmitted per symbol from 4 to 5 results in a 25% increase in throughput (data rate), but requires a 100% increase in transmitter bandwidth.

An example of an orthogonal signalling set that fits within, i.e., is supported by, the bandwidth of a direct sequence spreading code is the Walsh-function waveform set. As a high-order alphabet, these waveforms can be directly modulated by pseudo-noise spread spectrum modulation, without exceeding the occupied transmit bandwidth required for spread spectrum signalling alone. Since spread spectrum frequency allocations and spread spectrum transceiver equipment are inherently wideband, the Walsh-function waveform set does not require additional bandwidth when used in conjunction with DSSS encoding, even though it requires more bandwidth than the signal to be encoded when only Walsh-function encoding is used.

Consequently, use of the words 'spreading' and 'despreading' are to be interpreted as referring to modulation and removal, respectively, of a DSSS encoding waveform, whether or not there is a change in bandwidth due to the DSSS waveformn. In the case of a Walsh-function waveform of a bandwidth that is less than the bandwidth of the DSSS encoding waveform, the term 'spreading' and 'despreading' may be understood in a more conventional sense.

The invention employs a Walsh-function waveform set that includes a plurality of mutually orthogonal binary waveforms which can be synchronously modulated upon a spread spectrum code such that all binary transitions of both the Walsh-function waveforms and the spread spectrum waveforms occur simultaneously with a transition of a common clock signal. The clock signal frequency is selected so as to support the finest possible pulse structure in each Walsh-function and spread spectrum waveform. The finest pulse structure that can occur in a waveform determines the bandwidth of the waveform. Therefore, the clock rate establishes the bandwidth of the waveform. As long as a waveform signal transition occurs at a clock edge, a multiplicative composite of a Walsh-function and spread spectrum waveform will not require additional bandwidth beyond the bandwidth of its two constituent waveforms. Consequently, Walsh-function waveforms having a bandwidth less than or equal to the bandwidth of the DSSS waveform can be used without any increase in bandwidth of the Walsh-function/DSSS composite waveform.

In another preferred embodiment, the orthogonal signal set is supplemented with an antipodal signal set to form a bi-orthogonal signal set, further increasing the data rate achievable at a given DSSS processing gain. Other embodiments include: noncoherent signalling across two symbols, as in differential phase shift keying (PSK), to perform the bi-orthogonal signalling; coherent and noncoherent M-ary phase shift keying, combined with orthogonal signalling within a single symbol; and differentially encoded coherent phase shift keying across two symbols, with orthogonal signalling within a symbol.

BRIEF DESCRIPTION OF THE INVENTION

The invention will be more fully understood from the following detailed description, in conjunction with the accompanying figures, wherein.

Figure 5A:
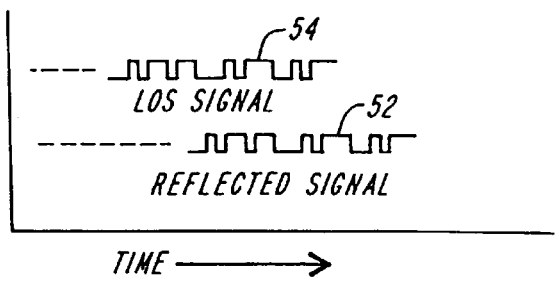
Figure 5B:
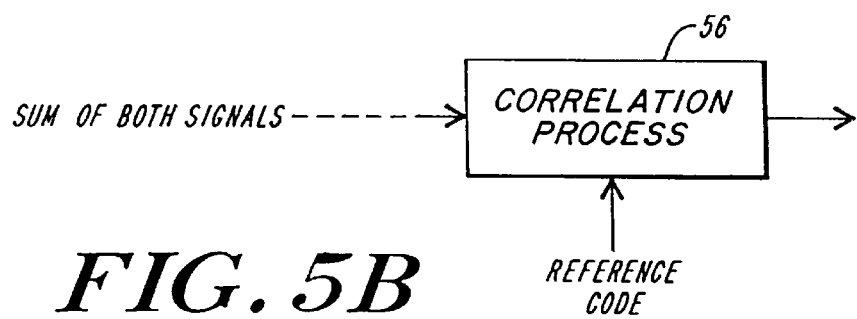
Figure 5C:
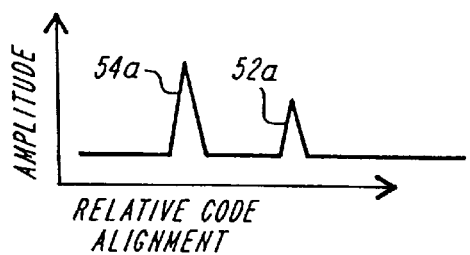
Figure 6:
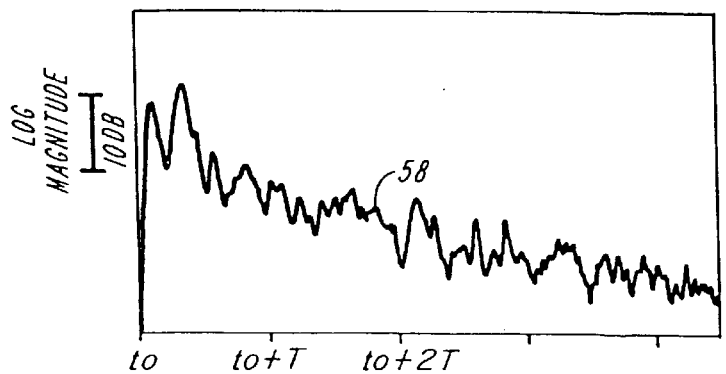
Figures 7, 8:
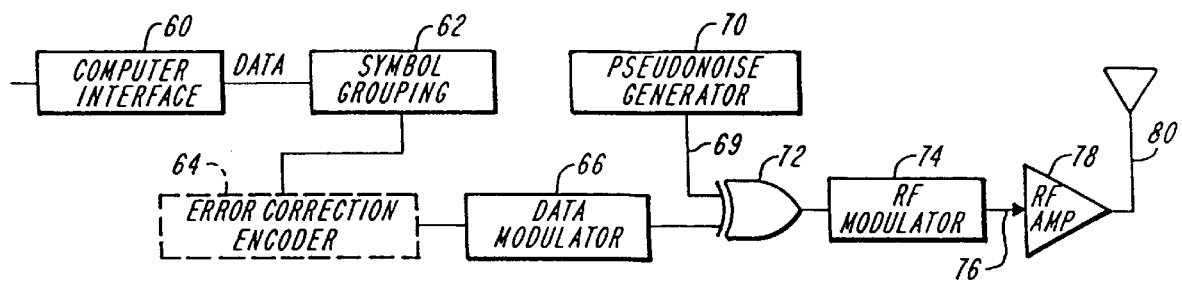
Figure 9:
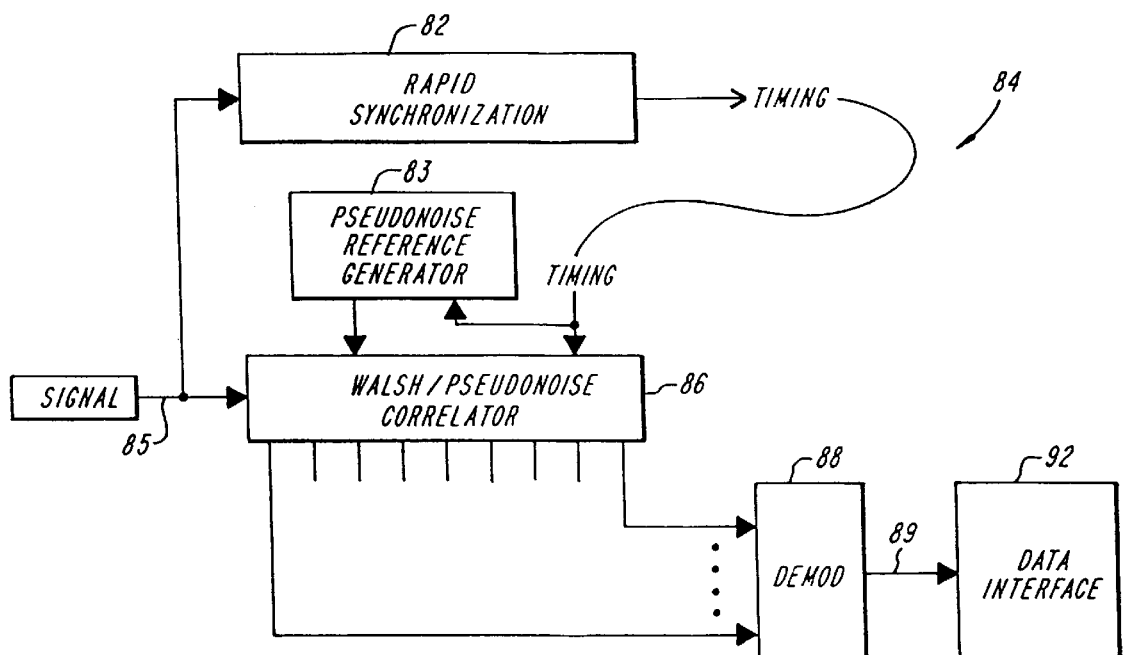
Figure 10:
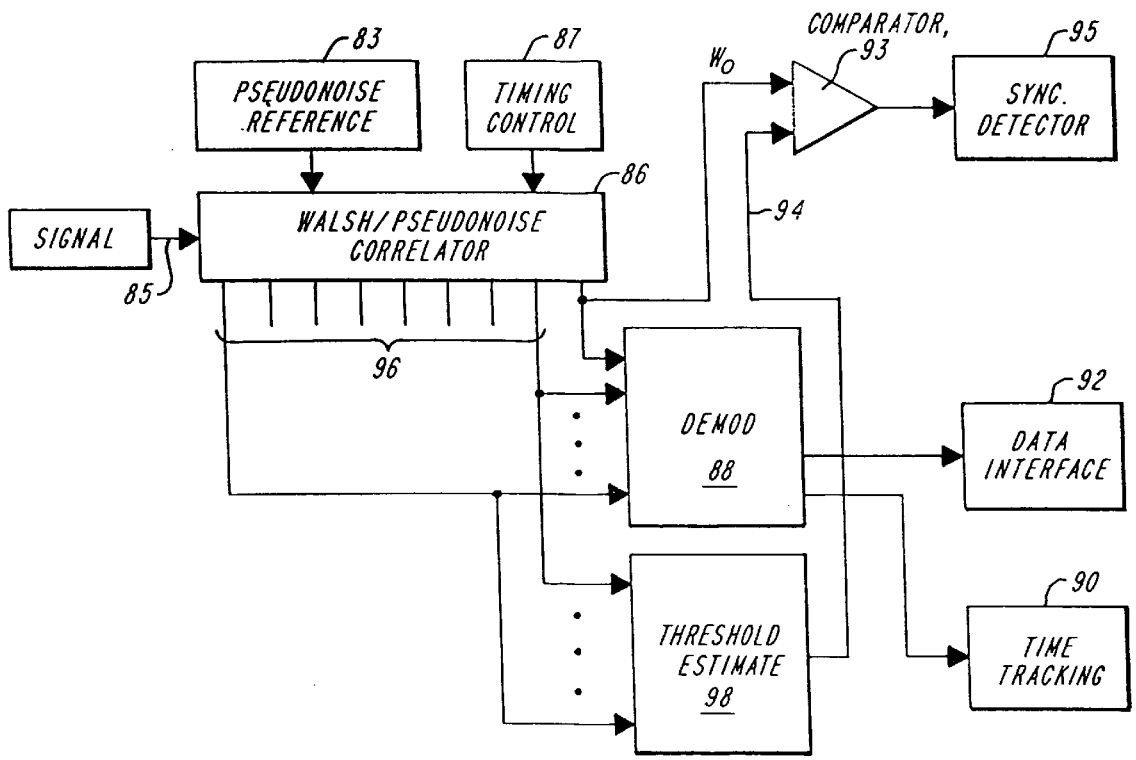
Figure 11:
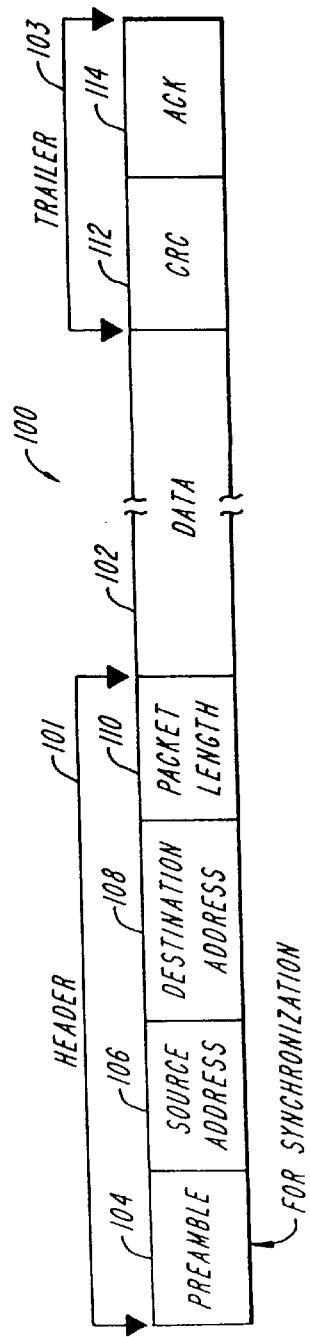
Figure 12:
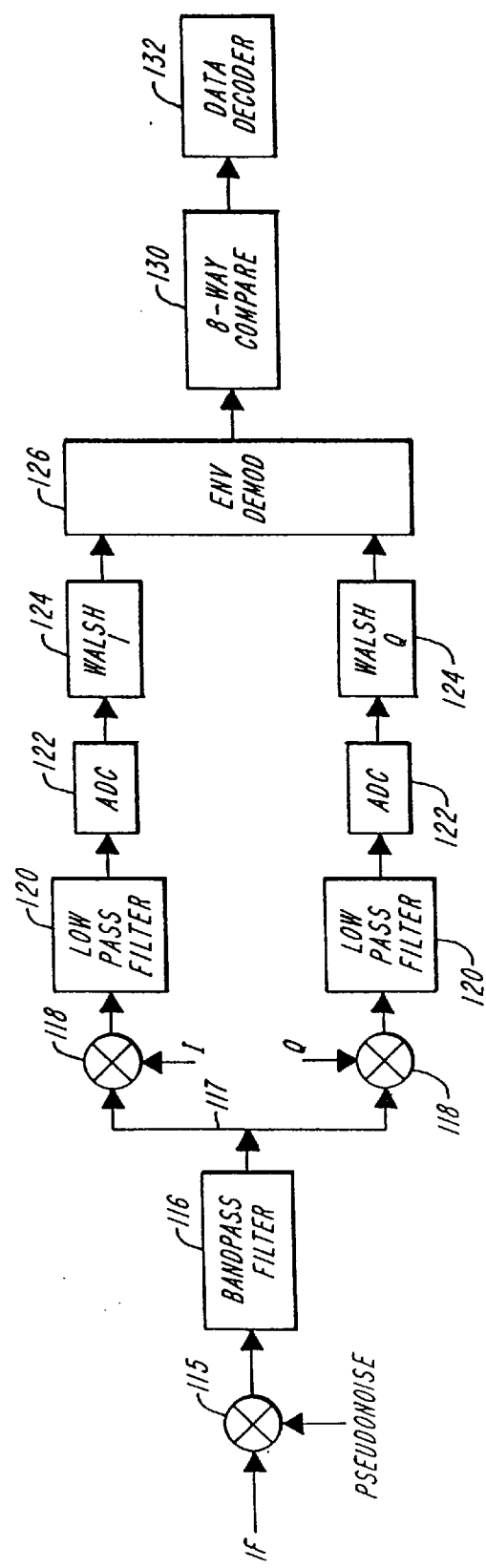
Figure 13:
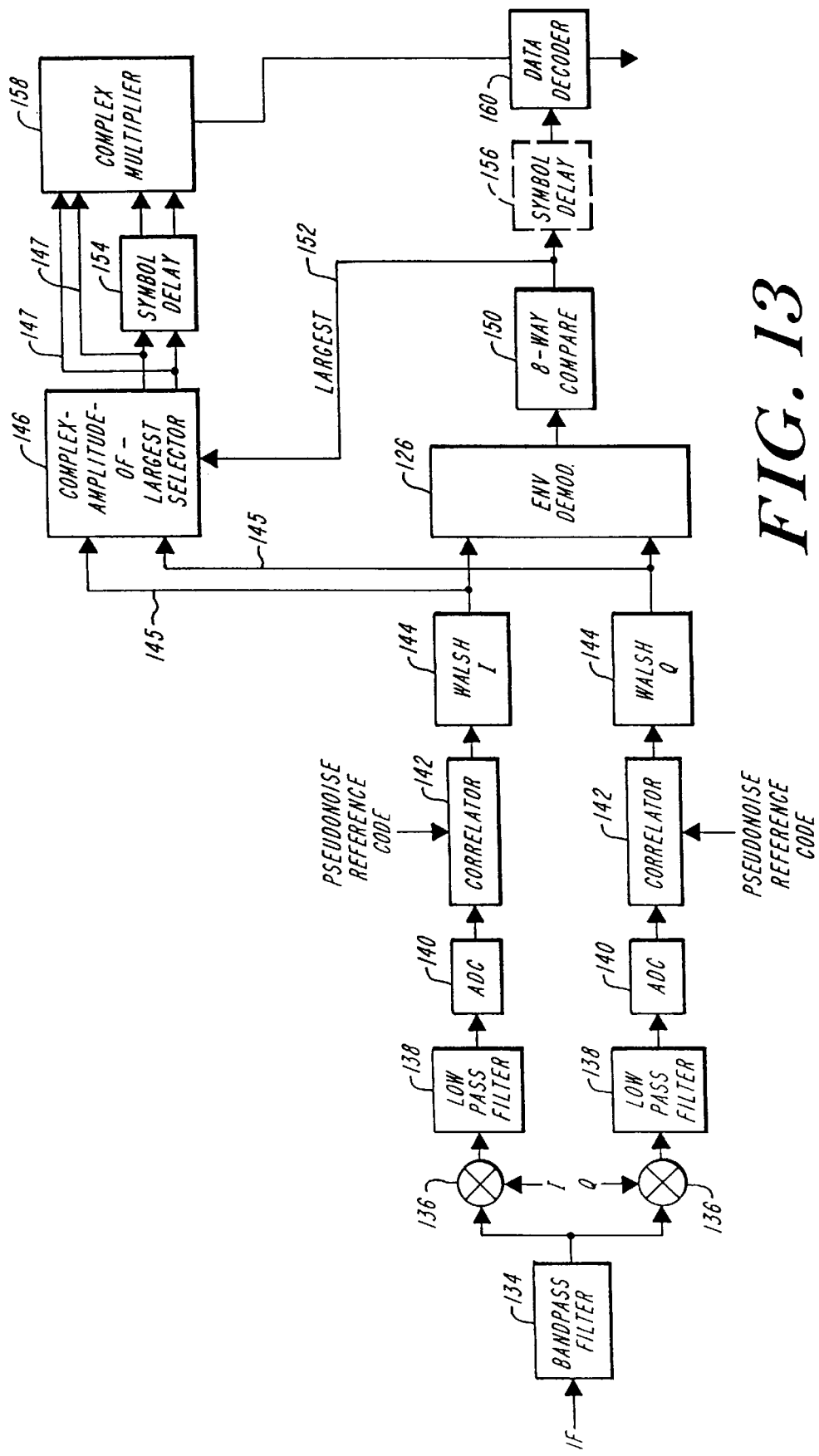
Figure 14:
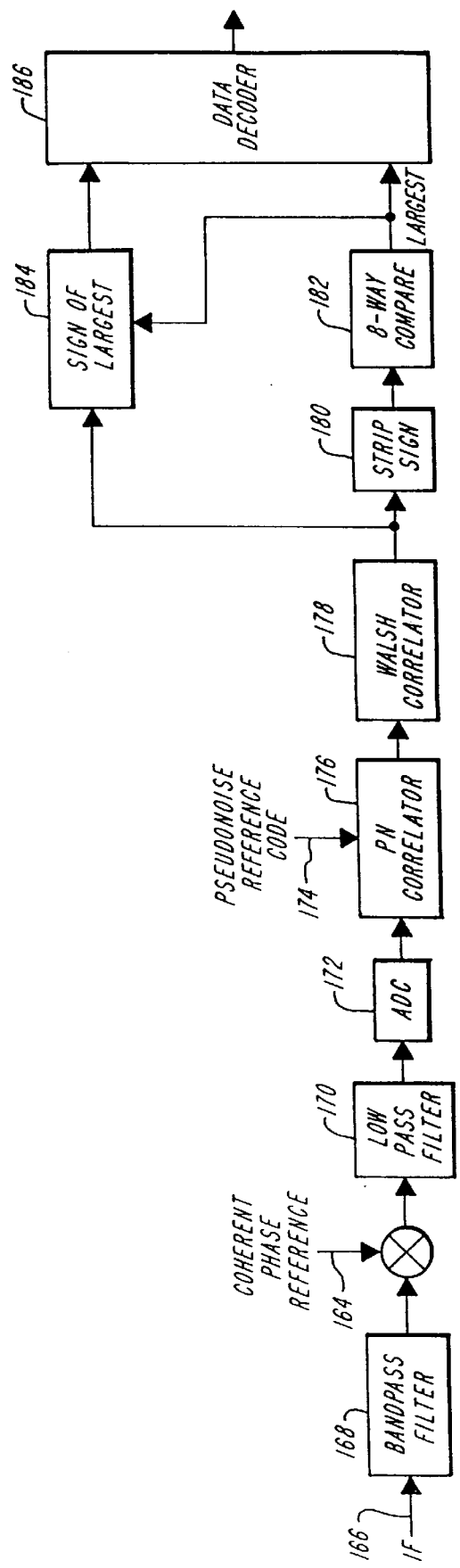
Figure 16:
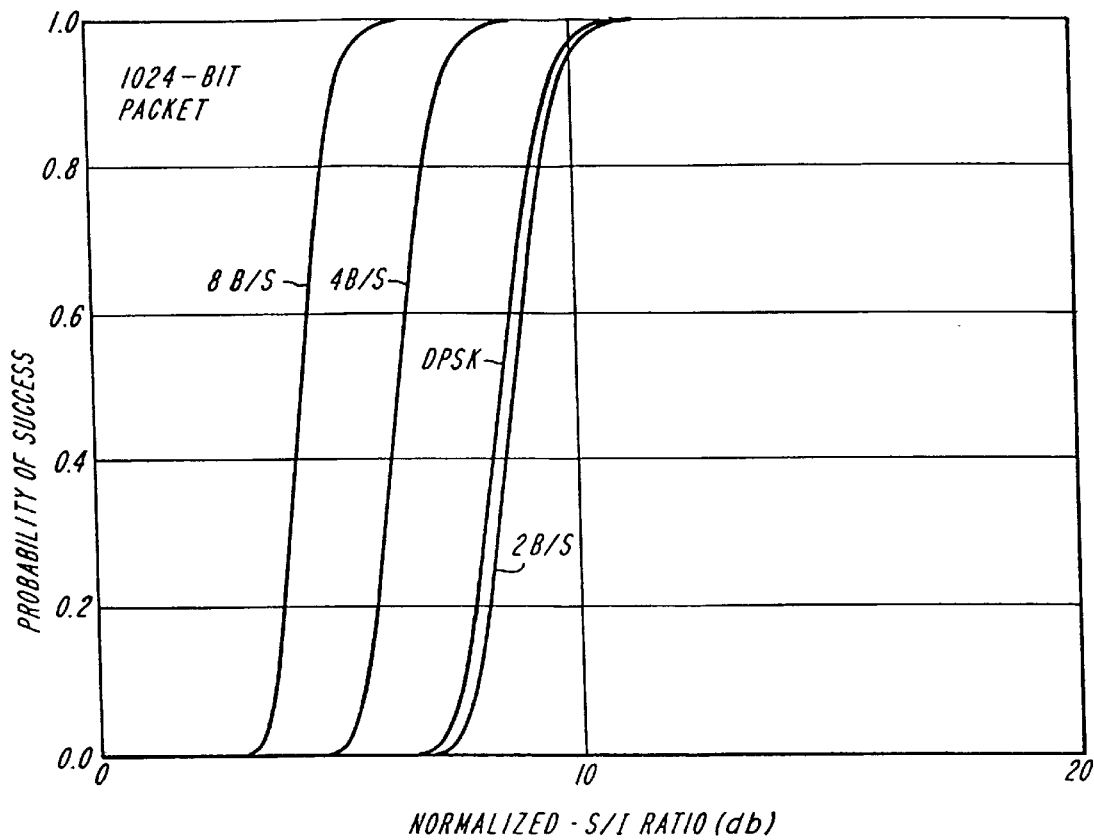
Figure 17:
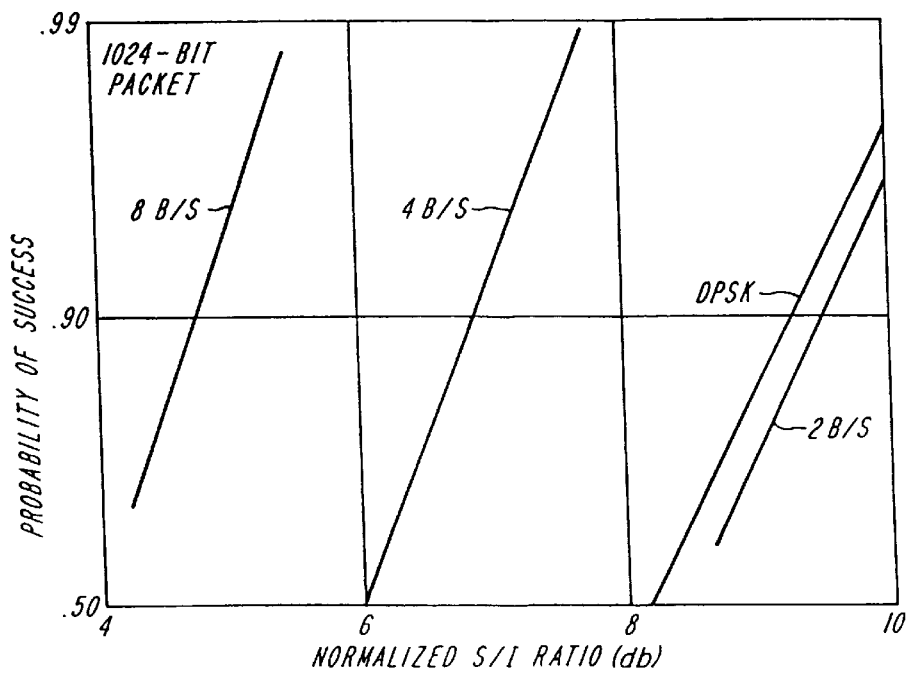
Figure 18:
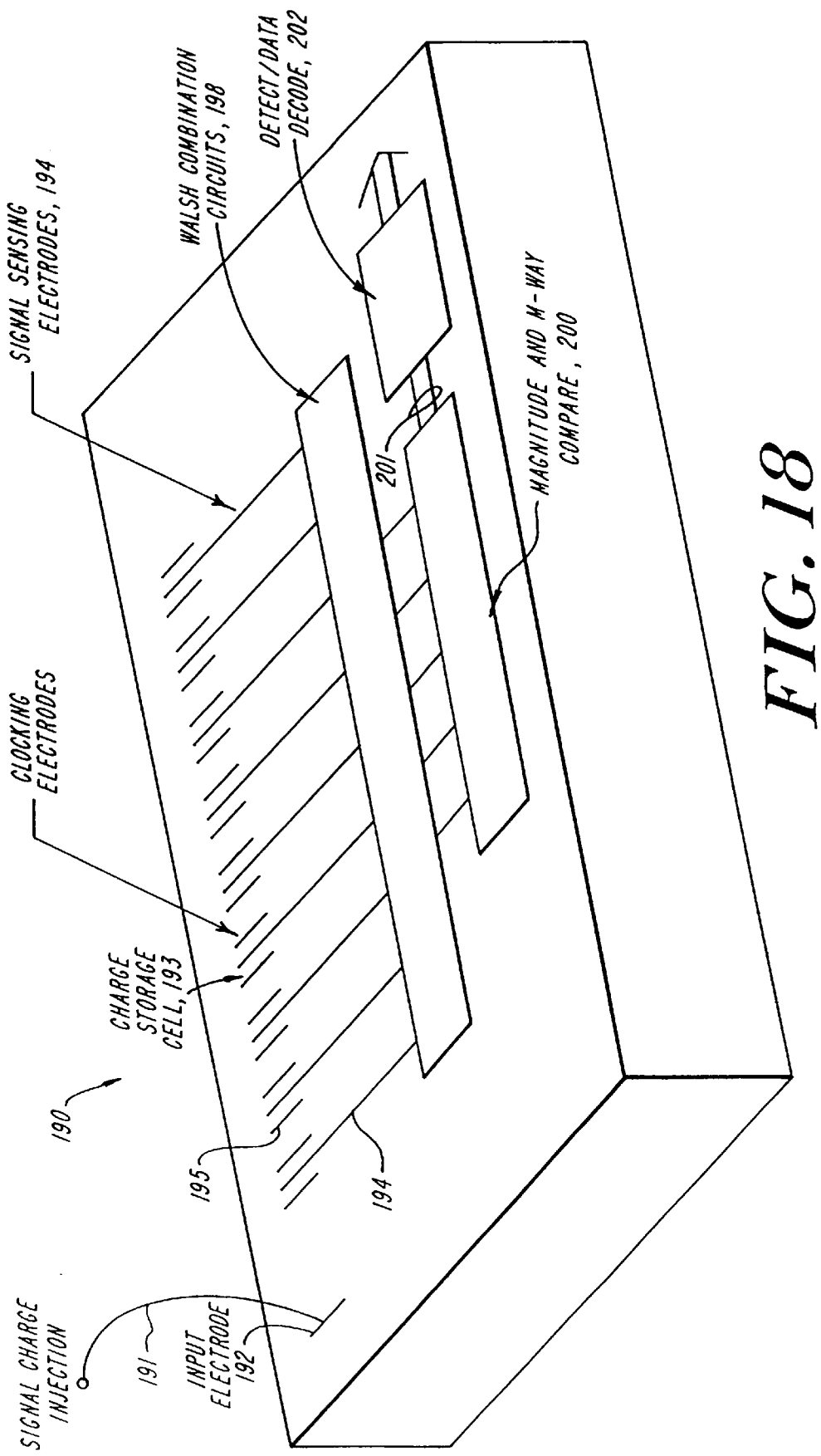
Figure 19:
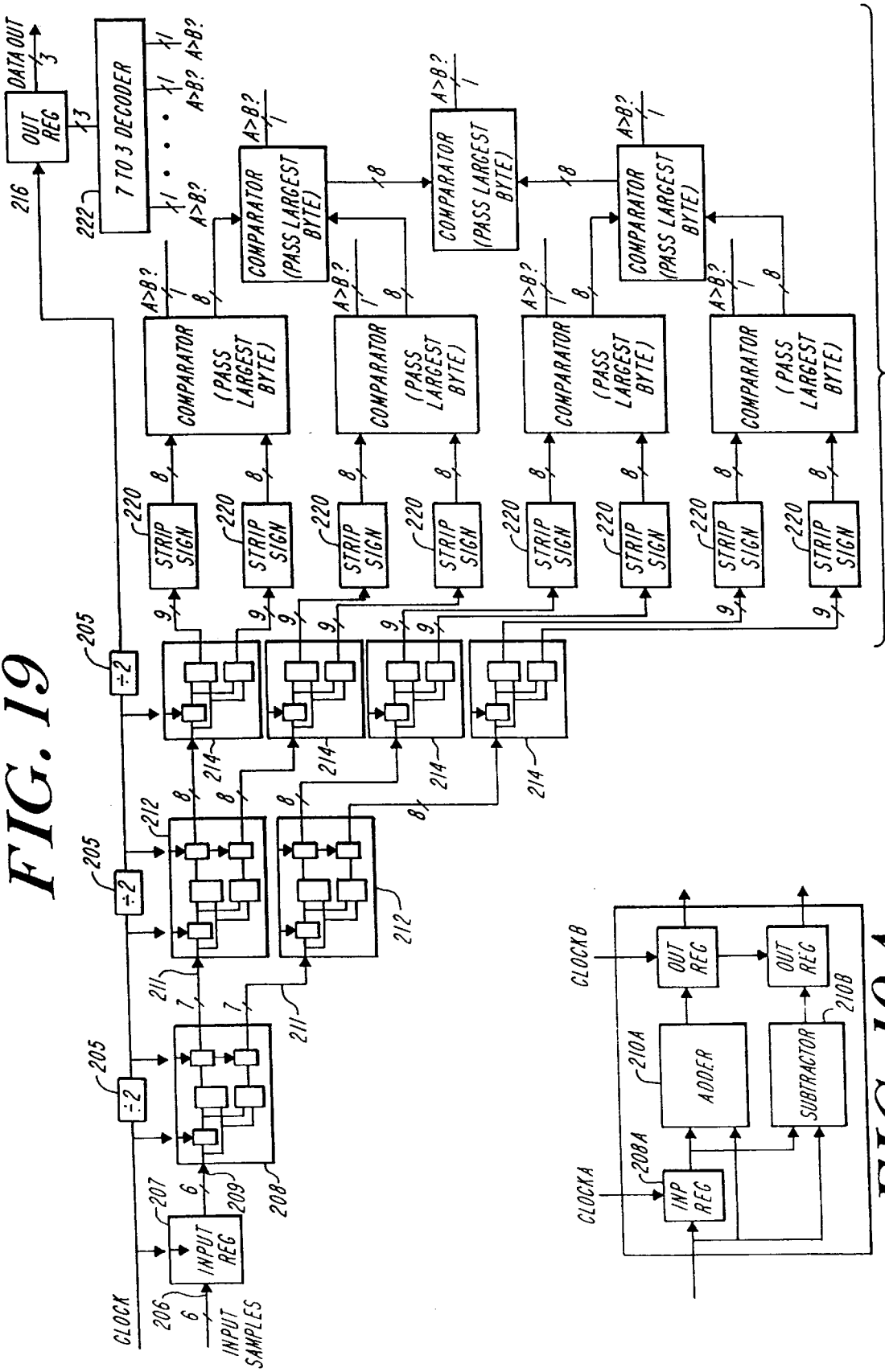
Figure 20:
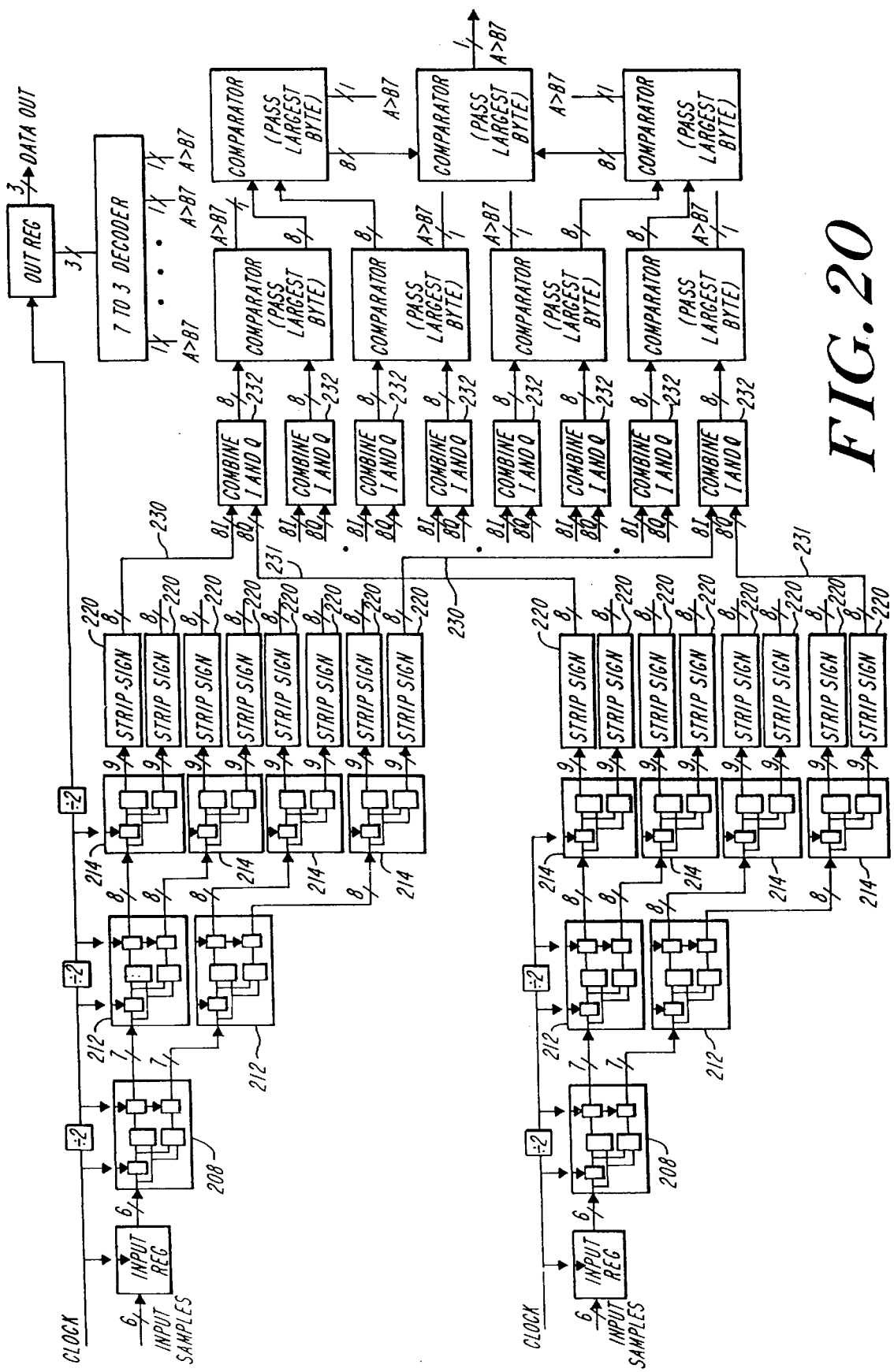
Figure 21A:
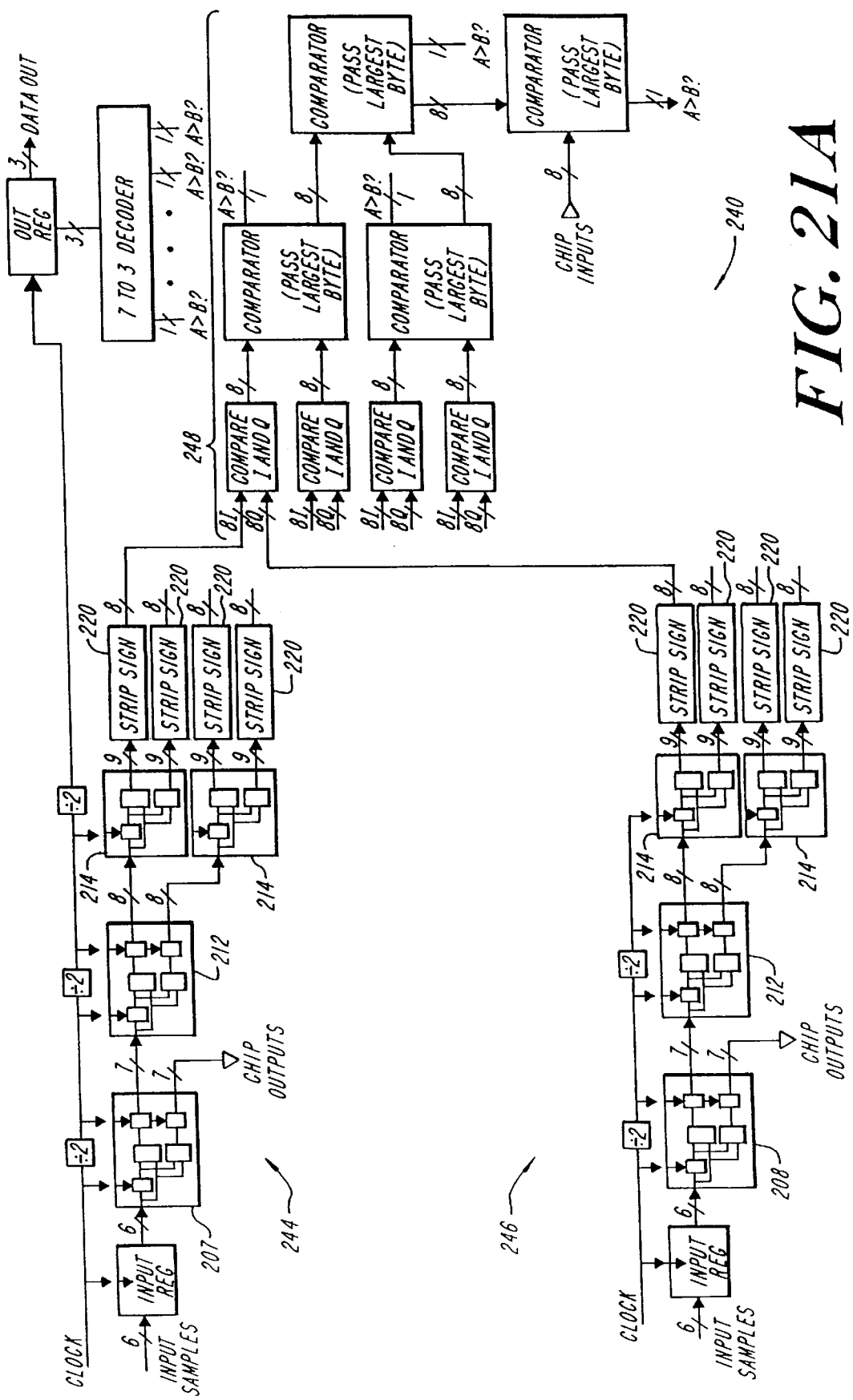
Figure 21B:
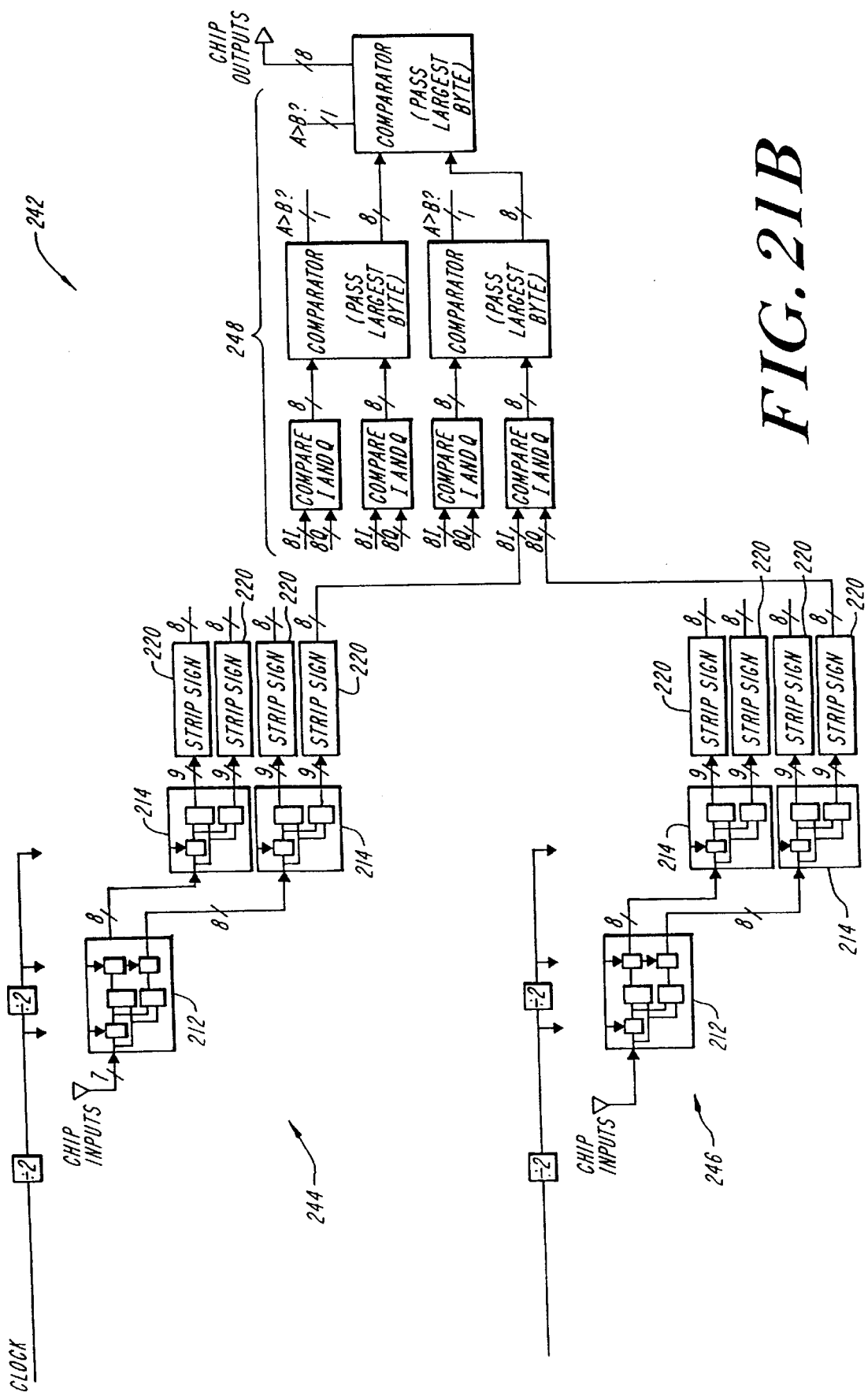
Figure 22:
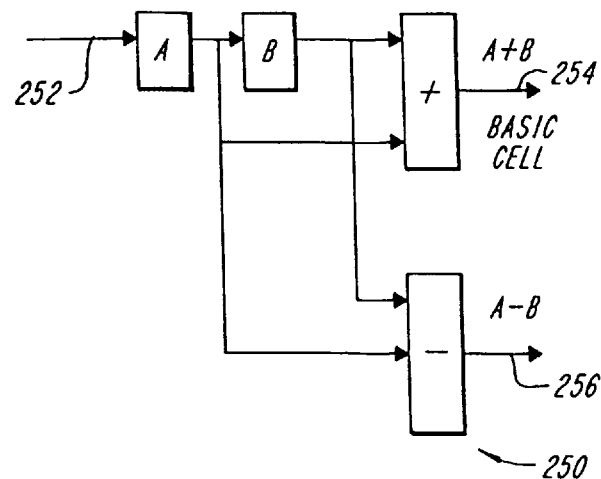
Figure 23:
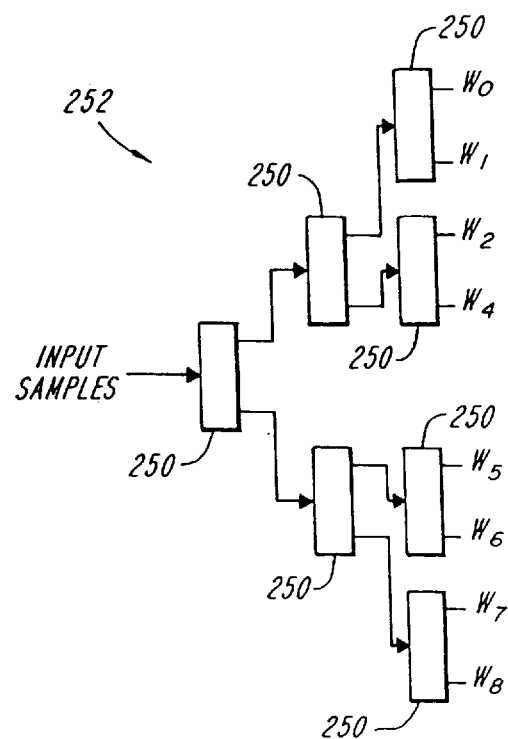

FIGS. 5A, 5B, and 5C are, respectively, a time-domain signal plot of line-of-sight and reflected signals, a block diagram, and a correlation process output plot, together showing a correlation process operating on the sum of the line-of-sight and reflected signals to produce a correlation process output trace;

FIG. 6 is a plot of time versus the log of measured impulse response showing the elimination of the significant intersymbol interference provided by DSSS encoding of each symbol;

FIG. 7 is a chart of LAN types showing rapid synchronization requirements;

FIG. 8 is a block diagram of a spread spectrum transmitter;

FIG. 9 is block diagram of a spread spectrum receiver having a rapid synchronization circuit which provides a timing signal to a correlator demodulator;

FIG. 10 is a schematic of a spread spectrum receiver having a sliding serial correlator for performing synchronization;

FIG. 11 is a diagram of an example of a data packet structure;

FIG. 12 is a schematic diagram of a correlator demodulator that employs bandpass direct-sequence (DS) removal;

FIG. 13 is a schematic diagram of a non-phase-coherent correlator demodulator for orthogonal signalling that employs baseband DS removal and noncoherent DPSK;

FIG. 14 is a schematic diagram of a phase-coherent correlator demodulator for orthogonal signalling that employs baseband DS removal and coherent PSK;

FIGS. 15A–15H are waveform traces showing the first eight Walsh-function waveforms in ascending Walsh order;

FIG. 16 is a plot of the probability of correctly demodulating a 1024-bit data packet versus signal-to-interference ratio for DPSK signaling and orthogonal signalling at various data rates;

FIG. 17 is an enlarged portion of the plot of FIG. 16;

FIG. 18 is an integrated circuit layout diagram of a charge transfer device implementation of a receiver of the invention;

FIG. 19 is a schematic diagram of demodulator chip circuitry for use with a coherent carrier-phase reference signal;

FIG. 19A is block diagram detailing the add/subtract block of FIG. 19;

FIG. 20 is a schematic diagram of the demodulator chip circuitry for use with a carrier signal of unknown phase, wherein both in-phase and quadrature-phase channels are processed, and wherein the combining circuitry of the demodulator chip is shown schematically;

FIGS. 21A and 21B are schematic diagrams showing a preferred partitioning of the circuitry of FIG. 20 into two chips, or for realizing a cascadeable structure;

FIG. 22 is a schematic diagram of a basic cell for computation of Walsh coefficients; and FIG. 23 is a schematic diagram of a plurality of the basic cells of FIG. 22 interconnected in a tree architecture, for computation of Walsh coefficients.

DETAILED DESCRIPTION OF THE DRAWINGS

The invention provides an apparatus and method for reducing multipath interference effects, while also providing high data rates in a local-area network data communications environment. The apparatus and method of the invention combines a higher-order signaling alphabet, such as an orthogonal signal set, with direct-sequence spread-spectrum (DSSS) modulation.

As recognized by the invention, an orthogonal signalling set that requires no more bandwidth than the bandwidth of the spreading code of the DSSS modulation is, for example, the set of Walsh-function waveforms. As a high-order alphabet, these waveforms can be combined with a pseudonoise (PN) direct sequence spread spectrum (DSSS) waveform without increasing the occupied transmit bandwidth beyond the bandwidth required for the spread spectrum signalling alone. The Walsh-function signal set includes binary waveforms which can be synchronously multiplied by the DSSS waveform such that all binary transitions of the Walsh-function waveforms occur at transitions of the same clock signal that generates the DSSS waveform.

The bandwidth of a waveform is determined by the finest possible pulse structure of the waveform. Since each clock transition represents a potential signal transition, the clock rate establishes the finest possible pulse structure of a signal waveform. Any signal transition of the highest bandwidth waveform that occurs at a clock edge will not require additional bandwidth beyond the bandwidth of the clock signal.

There exist other ways to provide an orthogonal signal set for use with spread spectrum techniques. Instead of using a separate multiplicative orthogonal signal set, such as the Walsh-functions, in conjunction with a single pseudo-noise spreading code to implement the signaling, the symbol waveform can be chosen from among a set of nearly orthogonal pseudo-noise (PN) spreading codes, or phase shifts of these spreading codes. Modulations that transmit a variety of shifts of the same code include pulse position modulation (PPM), and cyclic code shift keying, for example, but these time-shift modulations are unsuitable because the demodulation can be ambiguous when subjected to multipath time delays. Modulations that send one of a set of PN spreading waveforms to relay the data also have several problems.

Only PN waveforms that are cyclic, maximal-length sequences without data modulation exhibit the requisite nearly orthogonal cross-correlation properties. Randomly chosen PN waveforms exhibit average cross-correlation values (between different pairs of waveforms) that are equal to the processing gain of the PN waveform. It is difficult to derive a subset of waveforms that have good crosscorrelation properties. The number of required waveforms increases exponentially with the number of bits per symbol that must be transmitted. These waveforms, once determined, must be generated with independent PN generators, because each waveform is unrelated to each of the others in structure.

At the receiver, a separate spread spectrum correlator must be provided for each transmitted waveform because the waveforms are generally independent of each other. Each correlator operates upon the received signal, and attempts to provide a level at the output of the correlator representative of the degree of correlation between a received-signal waveform and a reference waveform. Each waveform that can potentially be transmitted will be provided as a reference waveform in one correlator. The data decision as to which waveform was actually transmitted is determined by the correlator with the largest output signal.

By contrast, according to the invention, Walsh-functions do not exhibit these problems. The regular waveform structure of the Walsh-functions allows a set of waveforms of any order to be readily synthesized. In the receiver, the invention exploits a decomposition property of the Walsh-function waveforms that allows a correlator to be constructed from a plurality of identical elements, to be described below. Thus, according to the invention, Walsh-function orthogonal data modulation is the preferred form of data modulation to be used in combination with spread spectrum modulation.

However, any means for providing the correlation against each of a plurality M of Walsh-function waveforms will also suffice. Other examples, such as the fast Walsh transform (also known as the fast Hadamard transform) are equally useful when used in combination with spread spectrum modulation.

An orthogonal signal set is characterized by the property that each waveform has no projection on any other waveform in the set. By contrast, an antipodal signal set is characterized by the property that a waveform can have a negative projection onto another waveform. By combining the two signal sets, a bi-orthogonal signal set is formed, wherein both orthogonal and antipodal signals are possible. As a benefit, bi-orthogonal data modulation provides an extra data bit per symbol, without increasing the transmission bandwidth, or decreasing the processing gain. The accompanying slight increase in required signal-to-noise ratio is insignificant.

A bi-orthogonal signal set can be implemented in the Walsh-function demodulator, as illustrated in the exemplary embodiment of FIG. 14, wherein the positive and negative phase of any of the waveforms can be used as additional potential waveforms in a symbol. Thus, phase shift keying (PSK) can be combined with the orthogonal signalling. Bi-orthogonal modulation can be processed coherently if the phase of the received signal is tracked.

Alternatively, bi-orthogonal modulation can be processed non-coherently using differential phase shift keying (DPSK) between symbols, as illustrated in the exemplary embodiment shown in FIG. 13. If non-coherent DPSK is used, after the orthogonal receiver determines which waveform was most likely transmitted for each pair of consecutive symbols, the DPSK receiver determines whether it is likely that there was a phase inversion between the carriers of each pair of symbol waveforms. The next pair of symbols for this operation consists of the second symbol of the previous pair and a new symbol, just as in binary DPSK.

Just as coherent PSK can be used on each symbol if a phase reference is created at the receiver, multiphase phase shift keying can be used with orthogonal signalling to increase data rate. However, the bit error rate performance of this type of modulation degrades rapidly as the order of the signal set increases. Furthermore, multilevel DPSK, such as differential quadrature phase shift keying (DQPSK) can be used, which sacrifices bit error rate performance for improvements in data rate.

Several embodiments of the invention provide robust wireless LAN performance. One such embodiment employs a different PN spreading code for each successive symbol in a sequence of transmitted symbols. Errors due to high cross-correlation sidelobes in multipath between transmitted symbols are thereby randomized.

In a preferred embodiment, to further reduce error rates, error correction coding can also be employed. Error correction coding can be used to compensate for the portion of the error rate due to the high sidelobes that can occur under some multipath delay conditions, as measured at the output of the demodulator.

In other embodiments, the same PN code is repeated every consecutive symbol. Use of repeating PN codes can help to reduce the peak cross-correlation sidelobe levels, whereas changing codes cause some randomization of the levels between symbols.

Another embodiment of the invention uses a pulse-shaping filter on spread spectrum code modulation to reduce the bandwidth required to achieve a given processing gain. It is known in the art that a waveform that is square-shaped in the frequency domain, i.e., having no frequency sidelobes, provides the greatest processing gain. Thus, pulse shaping of the code trades higher time sidelobes for lower frequency sidelobes, i.e., squareness in the frequency domain.

Multipath Environment

Figure 1:
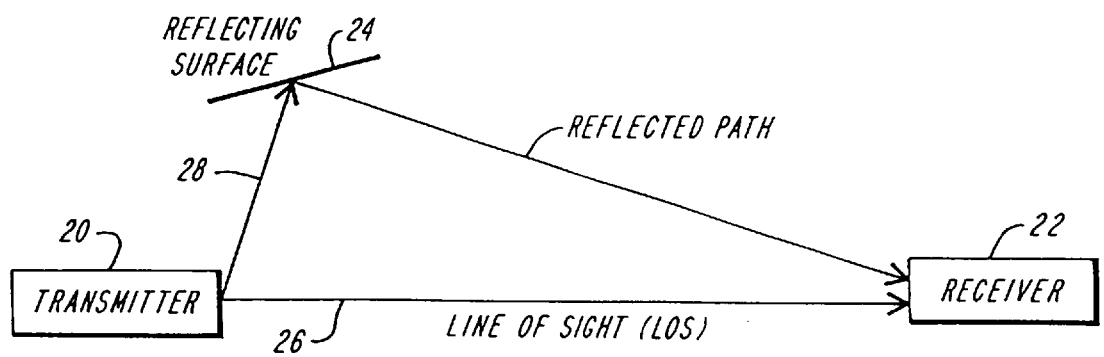
FIG. 1 is a schematic representation of a communications channel affected by multipath interference.

Referring to FIG. 1, it is useful to distinguish two major types of multipath interference. "Near-in" multipath interference is caused by the existence of a reflected version 28 of a line-of-sight (LOS) 26 signal that has travelled only a small distance further than the direct line-of-sight signal 26, thereby causing coherent cancellation and deep fading of the signal power of the received signal, which is a combination of at least the reflected signal 28 and the LOS signal 26. This type of reflected signal is delayed with respect to the LOS signal 26 no longer than the duration of one data symbol of the LOS signal 26, and so the interference resulting therefrom is referred to as "intra-symbol" interference. This type of multipath interference results from a signal travel path that reflects off a surface such that it is incident upon the receiver at a small angle with respect to the LOS signal 26.

Various frequency components of the LOS signal 26 and the reflected signal 28 destructively interfere at the receiver, resulting in nulls in the received frequency spectrum. For example, if a narrowband signal, i.e, a signal occupying a relatively narrow frequency range (commonly used in traditional communications) is used to modulate a carrier signal of a frequency that falls within a null in the received frequency spectrum, and the narrowband signal traverses both an LOS path and a reflected path to a receiver, the amplitude of the received modulated signal will be substantially diminished. It is even possible that the amplitude of the modulated signal will be diminished to an amplitude less than the amplitude of the noise introduced by the communications channel, resulting in data errors. This effect is known as multipath fading.

For example, where a receiver is disposed at a distance of 200 meters from a transmitter, and a signal reflector is disposed at a perpendicular distance of 45 meters from a line-of-sight path between the receiver and the transmitter, a reflected signal that originates at the transmitter, and is reflected towards the receiver by the reflector traverses an additional 20 m with respect to the distance traversed by a line-of-sight (LOS) signal. Thus, in this example, the reflected signal arrives about 65 nanoseconds (ns) later than the LOS signal. If the reflection is specular, which is often the case, the amplitude of the reflected signal can be nearly equal to the amplitude of the LOS, thereby causing deep multipath fading.

"Far-out" multipath interference occurs when a reflected signal travels a distance sufficiently greater than the distance traversed by the line-of-sight signal so as to cause a delay greater than the duration of one data symbol. The interference that results is called "intersymbol interference" (ISI). The causes of reflection can be similar to the causes of reflection in "near-in" multipath, but the geometry of the transceiver locations with respect to the reflecting surfaces creates an excess reflected path length that can extend beyond the symbol duration before it is sufficiently attenuated below the amplitude of the LOS signal. The invention removes the previously existing limitation that far-out multipath interference imposed on the data rate of binary communications.

When the reflection of the signal corresponding to a first data bit overlays the direct path signal corresponding to a second data bit, intersymbol interference (ISI) results. ISI can cause data recovery errors at the receiver. For example, if the transceivers are separated by 200 meters, and a reflector is disposed at a perpendicular distance of 150 meters from the line-of-sight path and equidistantly with respect to each transceiver, there is a reflected path that is 160 meters longer than the direct path traversed by the line-of-sight (LOS) signal. Thus, the reflected signal arrives at a time that is about 535 ns after the arrival time of the LOS signal. Binary signalling would be limited to much less than 2 Mbps in this operating environment.

Figure 2:
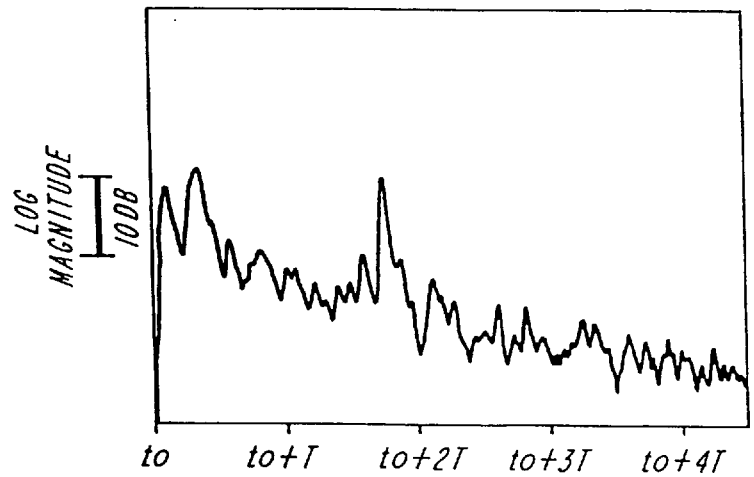
FIG. 2 is a plot of time versus the log of measured impulse response of a typical short range multipath channel exhibiting both intrasymbol and intersymbol interference.

FIG. 2 shows a plot of a typical filtered impulse response measurement of a wireless LAN communications channel. Here, T represents the duration of the symbol. The initial (filtered) pulse represents the line-of-sight response to an impulse that is transmitted. All later responses are due to reflections. Both the intrasymbol and intersymbol interference are apparent for this value of T.

Spread Spectrum Performance Advantages

Figure 3:
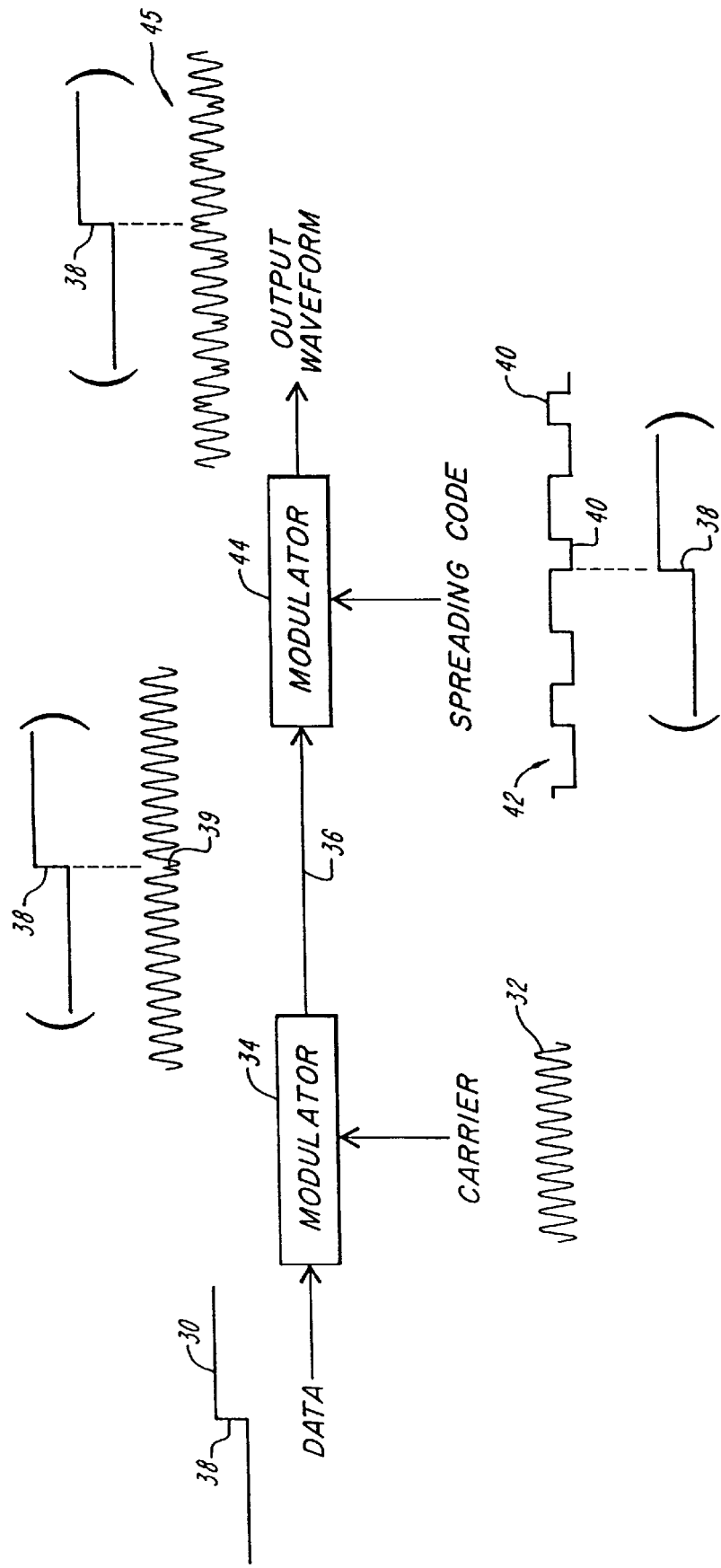
FIG. 3 is a block diagram of a spread spectrum transmitter and time-domain representations of associated waveforms.

With reference to FIG. 3, pseudonoise direct-sequence spread spectrum techniques (PN-DSSS) employ a multiplicative modulation step that distributes the transmitted signal over a greater range of frequencies (bandwidth) than is normally required to support the data rate. For example, binary data 30 is used to phase-shift-key-modulate a carrier signal 32 in a first modulator 34. The output 36 of the first modulator 34 has a frequency bandwidth that is on the order of the data rate of the binary data 30. The sharp signal transition 38 in the modulating data signal 30 causes a phase inversion 39 of the modulated signal 36. According to Fourier transform theory, the phase inversion 39 introduces high frequency signal components within the signal bandwidth.

The finest pulse structure 40 in the PN-DSSS spreading code 42 is commonly referred to as a chip 40, to distinguish it from a bit, which refers to the smallest possible pulse of a data signal. The PN-DSSS spreading code 42 phase-shift-key modulates the waveform 36 within a second modulator 44, resulting in many more phase inversions within each data symbol of an output waveform 45. The output waveform 45 of the second modulator 44 has a bandwidth that is equal to the bandwidth of the PN-DSSS code. The order of application of the modulations of modulators 34 and 44 can be reversed, and the modulations can also take the form of minimum-shift-keying, or various other continuous-phase-shift-keying waveforms that are known in the art.

Figure 4:
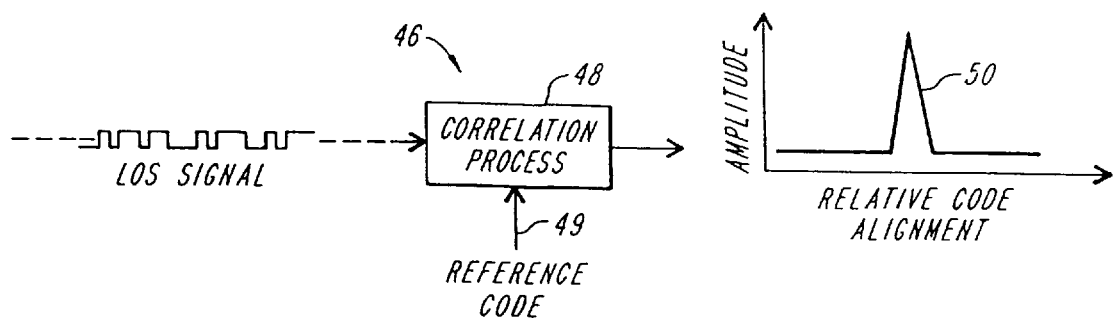
FIG. 4 is a block diagram of the correlation process used in a receiver to despread a line-of-sight (LOS) signal encoded by DSSS, and then corrupted by communications channel interference, thermal noise, and multipath effects.

Referring to FIG. 4, within a receiver 46, the spreading code 42 is removed by a correlation process, such as can be implemented in a matched filtering or serial correlator 48, using a reference code 49. The correlation process implemented by the correlator 48 provides a linear decomposition 50 of the individual propagation paths that make up the received signal. The decomposition is inherent in the signal processing and requires no feedback. Therefore, wideband channel dynamics can be handled without computational strain, in contrast with adaptive equalizer systems.

As depicted in FIG. 4, the correlation process 48 within the receiver 46 performs a cross-correlation of the local reference code 49 and the received signal 47 after it has been corrupted by transmission through a communications channel. The correlation process output 50 is depicted for a range of relative displacements of the received signal with respect to the reference code signal. The spreading code signal 42 is chosen such that the amplitude of its autocorrelation function is nearly zero everywhere except where the signals are aligned. Where the signals align, there occurs a triangular pulse, called a correlation spike 50, of width $2/T_c$ at its base, where $T_c$ is the chip width.

The peak of the correlation spike 50 occurs at perfect alignment. Recall that each bit of the spreading code is referred to as a chip, to distinguish it from a data bit. Thus, if there are sixteen chips of spreading sequence in a cross-correlation interval, e.g., the duration of a symbol, there are 16 possible ways the spreading code can be aligned with respect to the signal to be correlated, when the chip edges are also aligned. Fractional chip timing shifts account for unknown chip boundary timing. The correlation process determines which of the relative positions results in significant signal energy (correlation spike), the remaining relative positions having negligible signal energy, i.e., no appreciable signal spike.

Referring to FIG. 5, PN-DSSS spread spectrum modulation of the reflected signal 52 and the LOS signal 54 allows them to be resolved in time at the receiver using the correlation process 56, thereby eliminating multipath interference. After the correlation process 56, each signal 52 and 54 is represented by a displaced correlation spike 52a and 54a, respectively, each spike having an amplitude which represents relative received signal strength. In fact, the output of the correlation process, as the relative code alignment is swept out, approximates the impulse response of the communication channel resolved to the spreading bandwidth, as it is the linear sum of the autocorrelation functions of all of the signal paths.

According to the invention, a benefit of the use of PN-DSSS spread spectrum signaling is the mitigation of severe far-out multipath ISI. In a preferred embodiment, this is achieved by changing the spread spectrum waveform on each data symbol so that the ISI from each data symbol does not correlate with the DS code on any following symbols.

FIG. 6 is a plot of the correlation process output for the channel impulse response of FIG. 2. The far-out multipath portion of the channel impulse response 58 has been truncated beyond the symbol time because each data symbol is modulated by a different PN-DSSS waveform.

The correlation process can be implemented by using a serial correlator or a matched filter, or an approximation to either. A serial correlator (also called a sliding correlator) tests for signal detection after a period of processing called the detection interval. A detection interval is typically longer than a data symbol because more signal energy is needed to detect a signal than is needed to demodulate the signal to ensure acceptable wireless LAN performance.

The longer detection intervals are achieved by further integrating (either coherently or non-coherently) over multiple coherent-integration intervals, where each coherent-integration interval is of a duration normally associated with a data symbol. After a detection interval, if signal detection is not achieved, the serial correlator slides the reference timing by a fraction of a PN-DSSS code chip. The number of detection intervals that must be checked is the determined by the uncertainty in code timing and the amount of oversampling of the chip timing. For example, if timing is completely unknown and the detection portion of the preamble is a repeated sequence of sixteen chips, with a correlation every half chip for oversampling to prevent straddling loss, then no more than thirty-two detection intervals are required to achieve the proper timing for detecting a received signal. If the detection interval is ten symbols long, the transmitter must send a preamble that is 320 symbols long before sending any data. Furthermore, since the DSSS sequence is repeated within the preamble, and detection can occur on any repetition, after signal detection occurs, frame synchronization must be obtained to determine which symbol is the beginning of the data stream. Since there is sufficient signal-to-noise ratio for detection, frame synchronization can be accomplished using a simple frame sync bit pattern structure that is easily recognized.

It is commonly known that a matched filter synchronizer, or an equivalent device, can test all code timing relationships in a single detection interval, and therefore can serve as a fast synchronizer. The matched filter synchronization will be unambiguous in timing, in contrast with a serial correlator. Various approximations to a full-scale matched filter include a binary-quantized-input matched filter, or a matched filter that includes some non-coherent processing, or a matched filter that performs the full timing search in several steps (but not to the extent of a serial correlator).

The choice of whether to use a correlator or a matched filter for synchronization depends on the application. A correlator is much less expensive and less technology dependent. A matched filter is computationally intensive. A correlator can be used if the application can tolerate long synchronization overheads, or if there is a means to aid the detection process using a suitable data link protocol.

Local-area Network Channel Access Protocol

A communications-channel access protocol is a set of procedures that enables multiple users to access a common communications channel. For example, in some communications environments, where a plurality of transmitters use the same communications frequency band, a communications-channel access protocol, based upon throughput requirements and communications traffic priorities, requires that each of a plurality of transmitters take turns transmitting over the channel. To send large blocks of data, computer communications protocols often break the data into smaller blocks called packets and send these. The packets are re-assembled at the receiver. Packetizing the data allows multiple users to share the communications channel fairly and efficiently.

FIG. 7 compares six known protocol types with respect to the speed of the synchronizer circuit required. The protocol that is used affects which speed synchronizer is required because synchronization overhead affects average data throughput. For example, signal detection in a serial correlator synchronizer is slow, in general, but its speed can be improved by using prior timing information if such use is supported by the protocol. The timing information can be determined by long-term tracking of timing at coarse resolution to minimize the timing uncertainty on each data packet. Alternatively, the timing information can be determined by central control of timing through broadcast transmissions from a timing hub. This type of communication system will be referred to as "time-slotted" to suggest the synchronous nature of the control information.

If the channel is not time-slotted, but is instead random access, then the length of the data packet used is critical. If the data packets are much longer than the preamble required for serial correlator synchronization, then the preamble will not affect the communications channel throughput efficiency. However, if it is desirable for the duration of the data packet to be short compared to the preamble, then a fast synchronizer must be used to preserve channel efficiency. Short data packets are sometimes required for optimizing traffic flow according to the type of data that is to be transmitted, for re-transmission control, or for operating in burst-interference environments.

It is commonly known that a matched filter synchronizer, or an equivalent device, will test all code timing relationships in a single detection interval, and therefore can serve as a fast synchronizer. It is essential that the synchronizer used is fast enough to obtain the low synchronization overhead required when short data packets are used.

Another approach is a network based on message switching instead of packet switching. In message switching, communications traffic is packetized, but each user of the channel transmits messages, where each message includes a series of packets, and no other user can interrupt a message. The synchronization does not need to re-occur in each packet as it does in packet switching where each consecutive packet can be transmitted by a different user. As seen in the chart of FIG. 7, only the packet switched, random access protocol that uses short packets requires a fast synchronizer.

If the transmissions are message switched, or if the packets are longer than the clock stability or Doppler shift will allow, then a time-tracking loop must be used to maintain synchronization throughout a transmission. As an example, assume that a data rate of 5 Mbps and a packet length of 200 Kbits are used, resulting in packets of 40 ms duration. If the required time alignment must be held to within 20 ns (which must be substantially less than the duration of a code chip) of the initial synchronization timing, then a net clock offset of 20 ppm is required between the transmitter and receiver. Alternatively, a delay-locked timing control loop can be used to maintain the reference code alignment with the received signal. Alternatively, an automatic frequency control (AFC) loop can be used to lock the clock frequencies.

An embodiment of the transmitter for the wireless LAN communication system of the invention is shown in FIG. 8. A computer interface 60 provides a stream of binary data which is first divided into a sequence of data words by a symbol grouping module 62, each data word representing a symbol value. The symbol values may be optionally passed through an encoder 64 for error correction coding. For orthogonal signaling, Reed-Solomon error correction codes may be used with symbols matched to the modulation alphabet. For bi-orthogonal signaling, Reed-Solomon codes can be used exclusively, or a hybrid Reed-Solomon/binary coding technique can be used wherein Reed-Solomon coding is used to correct the orthogonal-demodulation process, and binary correction is used for symbol-to-symbol phase-inversion demodulation. Erasure decoding, whereby potential errors are indicated in the decoder based upon, for example, amplitude information, is an option with either orthogonal or bi-orthogonal signaling. For example, a symbol error that arises during orthogonal demodulation would make suspect the validity of a phase-inversion decision using the corresponding erroneous symbol.

More specifically, error correction coding commonly strives to correct a large number of correctable errors within a group of symbols. The group is called a "coding block". The Reed-Solomon coding block comprises a set of the original data symbols concatenated with some "check" symbols that appear the same as the data symbols but actually contain the coding information. As more check symbols are included with the data, more data symbols which are in error can be corrected. The ratio of data symbols to the total group size is called the "coding" rate. For example, "rate ½" coding means there are an equal number of data symbols and check symbols. Rate ½ is considered a low rate code. As a result of low-rate coding, the minimum signal-to-noise ratio in a Gaussian noise environment that the demodulation can effectively operate upon is reduced, and tolerance to bursts of errors can be achieved.

The apparatus and method of the present invention can use coding for a somewhat different purpose, and thus an aspect of the present invention is to include a coding approach that is generally considered unsuitable for the more common coding applications, such as for satellite communications or for correcting errors on hard disk drives used in computers. Those applications generally require low rate codes and large coding blocks to achieve the desired performance. In fact, there are integrated circuits available that implement the common coding approaches and they were found to be unsuitable for this application. As a unique problem of the wireless data communications system based on direct sequence and Walsh orthogonal signaling, depending on the direct sequence code being used and the actual multipath delay, there can be an irreducible error rate that results from multipath self-interference. This means that errors appear in the demodulated data even at very high signal to noise ratios.

To solve this problem, a high rate code is used. That is, a small number of check symbols per data block is preferably employed. This unique way to use coding eliminates the irreducible error rate while maintaining the high throughput requirements of the wireless data communications network. If the more common coding approach were used, the irreducible errors would be eliminated, but at the cost of a severe drop in data throughput, and a severe increase in hardware and software complexity. According to an aspect of the present invention, while such costs are often deemed necessary for other applications, it is not desirable for solving the multipath problem in the wireless data communications network.

The high rate error correcting code may be aided by changing the direct sequence code on each symbol, which randomizes the effect of the multipath on each symbol, even though the multipath is static between symbols. Furthermore, a short coding block is preferably used. The short coding block allows the high rate code to provide robust packet performance even with a small amount of correctibility within each block. There are other reasons that the smaller coding block is desireable: a smaller library of direct sequence codes may be used from which codes are selected for changing on each symbol within a block; less latency occurs between the demodulator and the computer; there are less computational requirements, and less data storage is used while the correction is invoked.

For applications which must be tolerant to bursts of errors, only a large coding block can be used. For random errors, on the other hand, a given code rate, and hence tolerance to some average error rate, may be achieved by different block sizes as long as the ratio of check symbols to block symbols is the same. Because longer code blocks offer somewhat better performance, conventional coding designs normally employ long blocks. The term "short block" as used herein means a block size small enough that a given average random error rate may be tolerated with only the ability to correct a single error. While conventional coding implementations must employ complex, iterative decoding procedures running in sophisticated processors, single-error-correcting codes may be decoded directly using relatively modest digital logic. Thus, the use of a short coding block allows high-data-rate error correction with low delay and simple circuitry.

As a preferred embodiment, the high rate code is a single-error-correcting Reed-Solomon code whereby only one symbol in each coding block may be corrected. Thus a simple implementation of a decoder may be built that uses a simple symbol wide feedback shift register or a look-up table containing the entire decoding operation when the encoded signal is received, as described in greater detail, hereinafter. A coding block that is 15 symbols long with 2 check symbols forms a single-error-correcting Reed-Solomon coding block that is rate 13/15 (also written as RS(15,13)), which can handle symbol-error rates approaching 1/15, and which can be decoded at the receiver within a minimal time period and with a minimum of computational complexity.

The basic RS(15,13) code is used for just the Walsh-Orthogonal part of the signaling (with either coherent or noncoherent demodulation). For Walsh-Bi-Orthogonal signaling (coherent or noncoherent demodulation) it is necessary to provide for correction of the binary element of the data in addition to the Reed Solomon coding. At the symbol signal-to-noise ratios required for orthogonal modulation, errors in the binary portion of the waveform are several orders of magnitude less probable than orthogonal-signaling errors, and hence, can be tolerated. If occasionally a transmitted packet of data is lost due to a random binary bit error, this will occur, on the average, much less frequently than packets being lost due to too many orthogonal-signaling errors (more than a single orthogonal error in a 15-symbol block using RS(15,13)).

The effect, on binary signaling, of having made an orthogonal-signaling error, however, is not negligible because the orthogonal demodulation is used to select the processing channel upon which to perform the binary portion of the demodulation. For coherent bi-orthogonal, for example, the occurence of an error in the orthogonal waveform decision will cause a 50% probability of error for the corresponding binary bit. On the other hand, for noncoherent bi-orthogonal signaling, the occurence of an orthogonal-signaling error will cause a 50% probability of error on the two DPSK bits which use that complex amplitude in forming a DPSK decision. Fortunately, the strong correlation between orthogonal-signaling errors and binary errors makes erasure decoding attractive, and erasure decoding requires fewer check bits than for random error correction.

As a specific case, the preferred coding for Walsh-Bi-Orthogonal signaling with 5 bits per symbol employs a 15-symbol block with 13 5-bit information symbols. The two 5-bit check symbols provide for correction when an arbitrary 4-bit orthogonal demodulation error occurs. After the R-S FEC has located and corrected the 4-bit orthogonal-signaling error, then the location of the suspected pair of DPSK bits, likely to be in error, is known. The binary (fifth) bits for each of the 5-bit check symbols conveys, respectively, parity for the even and odd sets of binary bits demodulated. This means that the adjacent binary DPSK bits are checked by different parity bits which makes parity checking useful for DPSK in which errors are likely to appear in pairs. Because random binary errors can be ignored, it is assumed that a single error can occur in either binary data group (even or odd) and the location of the binary bit that is suspect is known when an orthogonal-signaling error has been made. Hence the pair of parity bits is sufficient to correct the binary data.

Referring again to FIG. 8, the data modulator 66 translates its input data into corresponding Walsh function symbol waveforms, and an appropriate phase change is then optionally added between symbols. The data modulator 66 translates its input symbol value into corresponding Walsh-function symbol waveforms by selecting from either a stored set of waveforms, or by selecting corresponding logic in a digital waveform generator. For the bi-orthogonal or differentially bi-orthogonal modulation, the phase inversion control is accomplished by either complementing or not complementing the binary Walsh-function output so as to increase the information content of the symbols, thereby increasing the data rate. An exclusive OR logic gate 72 then combines the resultant waveform with a PN-DSSS waveform 69 generated by a direct sequence pseudonoise generator 70. The output of the logic gate 72 drives an RF modulator 74 that provides a transmit signal 76, which is then amplified by an RF amplifier 78 for broadcast over an antenna 80 as packets of data.

The order of application of the modulations provided by the modules 70, 72, and 74 are unimportant, and can therefore be reversed. Also, the RF modulator 74 can be implemented in stages, for example, by first employing intermediate frequency modulation, then employing modulation with a final transmitted frequency, with associated filtering.

The data modulator 66 can incorporate any phase shift modulation, in addition to the selection of the Walsh function. Coherent M-ary PSK, or non-coherent differential phase shifts between symbols, such as DPSK, DQPSK, or differential M-ary PSK, can be used to increase data rate when signal-to-noise ratio is sufficiently high. Appropriate error correction encoding can be used in conjunction with these modulation schemes.

With reference to FIG. 9, in one embodiment of the invention, a receiver 84 includes a rapid synchronizer 82.

The output of the rapid synchronizer 82 controls the timing of the combination Walsh-function and PN correlator 86 and the PN reference generator 83. Various implementations of a Walsh-function/direct sequence correlator, such as the Walsh-function/pseudonoise correlator 86 of FIGS. 9 and 10 are provided in FIGS. 12, 13, and 14. Schemes for fast synchronization are well-known in the art, and can be used in a variety of forms with this invention. One example is a matched filter. Another example is an aided-acquisition correlator. The rapid synchronizer 82 must include a detection circuit with a detection threshold level. The threshold level may be fixed or it may be determined as a function of received signal level.

The correlator 86 drives a demodulator 88 that performs a maximum likelihood decision, or an approximation thereof. The correlator 86 has a plurality M of outputs, the number M of outputs being equal to the order M of the M-ary signal 85 to be demodulated. The particular output of the M outputs having the largest magnitude will most likely correspond to the reference waveform that matches the waveform that was transmitted. Accordingly, the M outputs of the correlator 86 drive the demodulator 88, which selects the largest magnitude output from among all the correlator 86 outputs.

Any phase shift data modulation that is used in addition to orthogonal modulation can be ideally demodulated by correlating against all possible waveforms in the demodulator 88. Alternatively, phase shift keying (coherent or noncoherent, and within a symbol or between symbols) can be demodulated separately by operating the demodulator 88 only on the selected orthogonal values resulting in insignificant loss in performance.

In an exemplary embodiment, for DPSK combined with M-ary orthogonal signalling, the M-ary orthogonal waveforms in each symbol pair are first demodulated. The outputs of the correlators that contained the largest outputs on successive symbols would then be used in the DPSK demodulation. In another exemplary embodiment, for coherent PSK combined with M-ary orthogonal signalling, the M-ary orthogonal waveforms in each symbol are first demodulated. The output of the correlator that contained the largest output for each symbol would then be compared to a phase reference in the PSK demodulator.

In the demodulator 88, after demodulation is performed, each demodulated symbol is then decoded for errors, if error correction coding was employed in the transmitter. The decoded symbols 89 are then concatenated within the data interface 92 to form a binary data stream to be received by a computer.

Note that no delay-locked timing control loop is included, because it is assumed that the packets are short enough to require rapid synchronization. However, a delay-locked loop or an AFC loop can be included if the packets are nevertheless too long for the timing drift specification, or if a variable length packet is desired.

With reference to FIG. 10, an embodiment of a receiver of the invention is shown that uses correlator synchronization, and includes an optional delay-locked time-tracking control loop 90. Any of the Walsh waveforms can be used as a synchronization signal transmitted at the start of a packet. As an illustrative example, the lowest order waveform $W_0$ will be used. In this case, the correlator 86 performs a serial correlator search for the PN code timing, using timing information as an input from a timing control module 87. The output signal $W_0$ is detected by a comparator 93, which can be analog or digital, depending upon the implementation technology of the correlator 86. The output signal of the comparator 93 is received by a synchronization detector 95. The synchronization detector 95 then prevents further searching for a signal and enables the demodulation process.

In an exemplary embodiment, the second input 94 to the comparator 93 is determined by the threshold estimation module 98 that sums the respective magnitudes of the outputs of one or more of the other channels 96. Since these channels 96 are performing orthogonal correlation with respect to the synchronization signal that is transmitted, the channels 96 provide a measure of the noise and interference power in the receiver. In the absence of noise and interference, only one of the channels 96 would be active. However, some degree of noise and interference is inevitable, and therefore each of the channels 96 is active to some extent. Combining a number of these channels 96 allows noncoherent averaging of the noise and interference power of the received signal, thereby providing a detection threshold level that adapts to maintain a nearly constant false alarm rate, where a false alarm is an erroneous interpretation of noise or interference as a true correlation signal. Using simultaneous correlations in orthogonal channels to establish the detection threshold level is superior to methods which average the level of a single correlator over a period that straddles multiple output samples because such methods experience transient response problems.

The demodulator 88 of FIG. 10 is the same as the demodulator shown in FIG. 9. Note that the optional time-tracking function 90, used to maintain synchronization during long packets, is explicitly indicated in FIG. 10, whereas the time-tracking function is implicit in FIG. 9. Methods for implementing the time tracking module 90 are well-known and include early/late correlation and time dither, and also include AFC if the source of timing drift is clock offset or Doppler.

An example of a data packet structure 100 that can be used with the invention is shown in FIG. 11. The data packet structure 100 includes a header portion 101, a data portion 102, and a trailer portion 103. The header portion 101 includes a preamble 104, a source address 106, a destination address 108, and a packet length 110. The preamble includes the synchronization signal, and optionally includes signals that the receiver can use to verify that a detection event occurred. The length of the preamble 104 is determined by the type of synchronization used. The preamble 104 can also be followed by other control information, such as error correction type or error checking on the control information itself. The body of the packet holds the data 102. The trailer 103 includes a cyclic redundancy check code 112 for final error detection. The trailer can also include acknowledgment information 114 regarding the successful or unsuccessful receipt of previous packets; this is known as "piggybacked" acknowledgements.

FIGS. 12, 13, and 14 show details of the combined Walsh-function and PN correlator block 86, and the data demodulator block 88 of FIGS. 9 and 10. For purpose of illustration only, these examples will use an 8-ary Walsh modulation to provide 3 bits per symbol. However, it should be recognized that the same circuits can be applied to orthogonal signaling of an arbitrary number of bits per symbol, including binary orthogonal signaling.

Pseudonoise (PN) removal can be performed directly on an intermediate frequency, or on the transmission frequency, by at least one mixer 115 and at least one bandpass filter 116, as shown in FIG. 12. If the Walsh-function coding does not occupy the full spread spectrum bandwidth (i.e., if there is more than one PN chip per Walsh-function clock cycle), then the bandpass filter 116 can filter to the Walsh-function bandwidth, resulting in a partial correlation. In this case, the bandpass filter 116, which can be implemented as a surface acoustic wave (SAW) filter, provides a square-shaped impulse response that filters the input waveform so that it falls within the bandwidth of the Walsh-function modulation. This filtered signal 117 is then split and sampled in I and Q channels by respective mixers 118, low pass filters 120, and A/D converters 122 thereby forming a complex representation of the signal 117, the I channel representing the real component, and the Q channel representing the imaginary component of the signal 117. The output of the A/D converters 122 is received by the Walsh-function demodulators 124 that correlate the signals with a reference Walsh functions. The outputs of the correlators 124 are envelope demodulated in a combining circuit 126 that provides an envelope output for each set of the eight sets of complex (I and Q) channels for the 8-ary modulation. The eight envelope outputs are compared in a 8-way comparator 130 to provide a largest magnitude index indicating which complex correlator 124 yielded an envelope output having the largest magnitude. The largest magnitude index indicates the most likely data symbol transmitted, as determined by the linear correlation process performed in the correlators 124. The data decoder 132 receives the largest magnitude index and the eight envelope outputs, and performs either a direct decoding to a binary stream of the selected Walsh-function correlator envelope output, or performs an optional Reed-Solomon, or hybrid Reed-Solomon and binary code error decoding if bi-orthogonal signalling is also used.

FIG. 13 shows and exemplary embodiment wherein PN removal is performed after analog-to-digital conversion, and immediately prior to performing Walsh-function correlation. It is also possible to perform PN removal at baseband using an analog multiplication prior to A/D conversion (not shown). The demodulator can be the same as the demodulator 130, 132 used FIG. 12, or DPSK can optionally be added between symbols. This form of signalling is called the non-coherent bi-orthogonal signalling, because DPSK is used.

To perform the DPSK demodulation, the output 152 of the 8-way magnitude comparison module 150, which module determines the largest correlator output, is used in selector 146 to multiplex to its output, from among the 8 complex amplitudes 145, the complex amplitude 147 of the largest signal, which complex amplitude 147 is to be used in the DPSK demodulation.

The DPSK decision is made using the selected outputs of two successive symbols in the complex multiplier 158 by using a symbol delay 154, taking the inner product of the largest amplitude correlator outputs and deciding the sign of the result. Independently, the index of the largest of each symbol is saved in a symbol delay module 156 as the correct value of the Walsh-function signaling. The data decoder 160 receives the Walsh demodulation result from the symbol delay module 156 and the DPSK demodulation result from the complex multiplier 158. These results are combined in the data decoder 160 by concatenating the single-bit DPSK answer with the 3-bit Walsh-correlator answer to obtain a 4-bit output (16-ary alphabet) on each symbol. Optionally, the data decoder 160 applies an error correction algorithm. The data decoder 160 then converts each resulting symbol into an equivalent binary data sequence for processing by a computer (not shown). The data decoder 160 serves to invert the operations performed by modules 62, 64, and 66 in FIG. 8. Note that symbol delay 156 is optional in accordance with which particular symbol aligns with the transmitted DPSK modulation. With symbol delay module 156 in place, the DPSK result aligns in the data decoder 160 with the Walsh-function symbol that was transmitted during the leading symbol of the DPSK symbol pair.

FIG. 14 shows a single channel demodulator for use with a coherent phase reference signal 164. An IF signal 166 is filtered by a bandpass filter 168. The filtered IF signal is multiplied by the coherent phase reference signal 164, which is provided by a carrier recovery loop (not shown). The resulting signal is low pass filtered by a low pass filter 170, and is then converted to a digital signal by an analog-to-digital converter 172. The resulting digital signal is despread by a PN correlator 176 using the PN reference code 174, and the resulting despread signal is then Walsh-function demodulated in a Walsh correlator 178. Any of the above described techniques for PN removal and Walsh-function demodulation can be applied, and can be applied in any order. If the PN spreading code is a higher rate modulation than the Walsh modulation, then the despread PN can be collapsed to the Walsh bandwidth in the PN correlator 176. Because the phase reference signal 164 is used, only a single channel (channel I) is required in this correlator. A sign stripping module 180 strips the sign bit from the digital signal provided by the walsh correlator 178, and an 8-way compare module 182 determines which correlator output of the correlator 178 is the largest. Since the phase reference signal 164 preserves coherence, optional PSK modulation can be used to provide coherent bi-orthogonal signalling. Demodulation requires that the sign bit of the largest value be selected in the sign register 184. A data decoder 186 optionally performs error detection and correction, and disassembles the symbol groups of the signal provided by the 8-way compare module 182 into a binary data stream for processing by a computer (not shown).

Walsh-Function Signaling

Figure 15A:
Figure 15B:
Figure 15C:
Figure 15D:
Figure 15E:
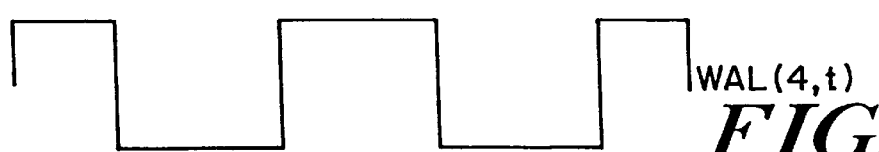
Figure 15F:
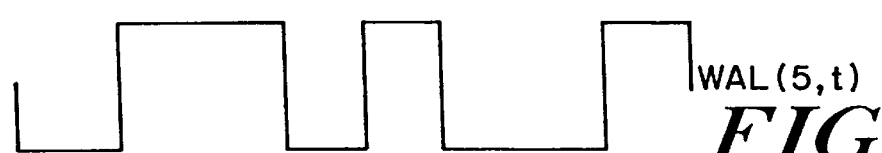
Figure 15G:
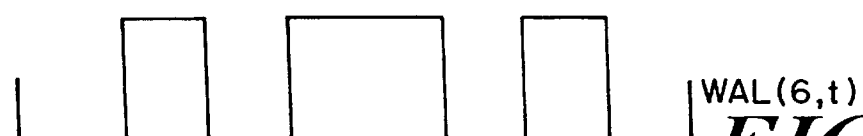
Figure 15H:
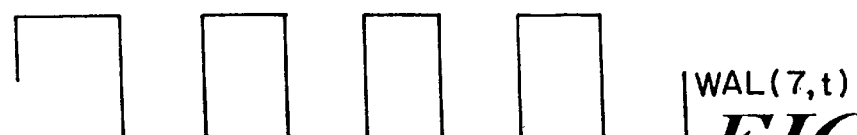

The first eight Walsh functions are shown in FIGS. 15A–15H. The lowest order Walsh function is shown in FIG. 15A, and the other Walsh functions are shown in ascending order in FIGS. 15B–15H. The lowest order function is referred to as $W_0$. Since in a communications environment the Walsh functions are a function of time, the Walsh functions may also be represented as W(n,t) or WAL(n,t), where n is the order of the particular Walsh function, and t represents time.

The Walsh functions are digital waveforms each being mutually orthogonal with respect another Walsh waveform of different order when multiplied therewith, i.e., the integral of the product of any two Walsh functions of different order being equal to zero. The order of each Walsh function is equal to the number of binary transitions exhibited by the function. For example, WAL(0,t) does not have a binary transition, whereas WAL(2,t) has two binary transitions. Equivalently, the Walsh function waveforms can be viewed as having one or more binary states over the duration of the waveform, wherein a binary state can be of a duration no greater than a minimum duration, called a Walsh chip.

For each symbol of a message, one of these digital waveforms can be logically combined by an exclusive-or logic gate with a direct-sequence spread spectrum code to create another digital waveform that can be used to phase modulate a carrier that has been modulated by the message.

FIG. 16 shows four probability curves. A curve denoted by DPSK shows the probability of correctly demodulating a 1024-bit packet of data using DPSK spread-spectrum signaling as a function of normalized signal-to-interference (S/I) in decibels (db). Three additional curves, denoted by the data rates (in bits per symbol) 8 b/s, 4 b/s, and 2 b/s, show the probability of correctly demodulating a 1024-bit packet of data using M-ary orthogonal signalling with 8, 4, and 2 bits per symbol, respectively. It must be stressed that M-ary orthogonal signaling is a form of coding; if the DPSK modulation were combined with coding, it would also shift to a lower required signal-to-interference ratio.

FIG. 17 shows the same curves on an expanded scale. Note that the use of 4-ary orthogonal (2bits/symbol) is substantially equivalent to DPSK, and that a higher signaling alphabet (4 b/s or 8 b/s) significantly improves performance. For an uncoded link, the above curves imply that, for a given bandwidth, the S/I ratio that can be tolerated at the receiver by combining M-ary (M>2) orthogonal signaling with PN-DSSS spread spectrum is larger than the S/I ratio that can be tolerated by combining PN-DSSS spread spectrum and either binary (M=2) signalling or DPSK. Conversely, for example, a transmission using 4 bits/symbol and a PN-DSSS bandwidth of 80 Mhz can tolerate as much interference at the receiver as a transmission using DPSK and a direct-sequence bandwidth of about 130 Mhz!

A rotation of the PN-DSSS code, known as cyclic code-shift keying (CCSK), provides an orthogonal set with some of the advantages of using the Walsh functions, such as the property that the bandwidth required for orthogonal signaling can equal the direct-sequence bandwidth, without further expansion of the signal bandwidth over that of the PN-DSSS code. Use of CCSK results in a correlator output waveform that is pulse-position modulated (PPM). However, in a multipath environment, the PPM-like behavior of CCSK can be problematic because an important feature of the signal, the delay discriminant used for demodulation, can be incorrectly interpreted as multipath. Thus, the use of CCSK is not preferable to the use of Walsh functions in a multipath environment.

If the bandwidth expansion due to the orthogonal signaling is much smaller than the direct-sequence spreading, then any orthogonal set can be used; in this case a convenient choice is a set of tones (i.e., M-ary FSK) which is demodulated using a fast Fourier Transform (FFT) technique after the spreading code is stripped off. However, when the spreading due to the orthogonal signaling approaches that due to the DSSS modulation, the actual transmission bandwidth depends upon both the direct sequence and orthogonal modulation since the pair of modulations cannot be synchronously superimposed in any way because they are drastically dissimilar modulations.

Even though both CCSK and Walsh functions have the property that the bandwidth required for orthogonal signaling can equal the direct-sequence bandwidth, without further expansion of the signal bandwidth over that of the PN-DSSS, CCSK cannot be used effectively in a multipath environment. Thus, for the purpose of limiting bandwidth and enhancing performance in a multipath environment, the Walsh functions are preferable to CCSK.

Walsh Function Correlation Processor

For this discussion, assume a received signal has been modulated using both PN-DSSS and Walsh functions. Also assume that, in the receiver, the reference PN-DSSS code for demodulating the received signal is properly aligned with the received signal, where synchronization is achieved by using, for example, a matched filter or a time-sliding serial correlator. Further, assume that the received signal and the local reference signal are multiplied together to form a despread signal, and that the despread signal is then low-pass filtered to facilitate processing the highest-order Walsh function. (For example, the highest-order Walsh function can have a bandwidth that only includes frequencies that are less than the DSSS chip rate.) The despreading operation has the effect of removing the PN-DSSS code, leaving only the Walsh function modulation.

The discussion below considers in-phase baseband processing. In an actual implementation, since carrier phase is usually unknown, the signal is converted to in-phase and quadrature channels, and the in-phase processing described below is performed in each channel, followed by envelope combining of the corresponding amplitudes before data decision.

One way to obtain the required correlations in the Walsh function correlation processor (e.g., modules 86, 124, 144, 178) is to implement a fully parallel fast Walsh transform. This approach becomes attractive only as the order of the Walsh functions becomes large. A preferred method for executing a fast Walsh transform is to exploit the mathematical structure of the Walsh functions by computing the Walsh function coefficients using a plurality of basic cells, shown in FIG. 22, interconnected as a tree structure having successive stages, as shown in FIG. 23. The clock rate of each successive stage is reduced by half with respect to the previous stage, and each successive stage has twice the number of cells, thereby keeping the computation rate per stage the same at each stage. The power consumed per stage, mostly dependent on computation rate, is therefore also nearly constant. Furthermore, the number of computation elements is far fewer than the number required in the fully parallel fast Walsh transform.

The parallel fast Walsh transform requires M(log M) computation elements per M-ary output. By contrast, the tree structure shown in FIG. 23 uses 2(M−1) computation elements per M-ary output. Therefore, at larger values of M, the tree structure of FIG. 23 is superior to the parallel architecture (not shown) for calculating the Walsh transform, because the number of computation elements per M-ary output is significantly less in the case of the tree structure. Both structures perform the same number of computations per symbol. The tree structure provides an tradeoff that is advantageous when implementing it as an integrated circuit, in that quantity of hardware can be traded for hardware operation rate.

Referring to FIG. 22, a basic cell 250 accepts input samples serially at input 252 at a rate $f_{in}$, and generates two output samples in parallel at outputs 254 and 256 at a rate $f_{in}/2$. Thus, a serial pair of input samples forms a parallel pair of output samples. One output sample of the output pair is the sum of a current pair of serial input samples, and the other sample of the output pair is the difference of these two input samples.

FIG. 23 shows a tree 252 of basic cells 250 for decoding the first eight Walsh functions $W_0$–$W_8$. Note that through the application of arithmetic sums and differences, each path through the tree represents a multiplication of the input sequence by a specific combination of (binary) square-wave functions and summing the result. In fact, the specific square-wave function for each path is a product of Rademacher functions, whose products are known to generate the Walsh functions.

Also note that the tree structure naturally conserves power because each successive stage includes twice the number of elements as the previous stage, but runs at only half the clock rate of the previous stage. Further, layout of the design on an integrated circuit is simplified, because the higher fanout signal distributions operate at proportionally lower rates. Therefore, slower circuits are connected by longer signal routes, as is desirable in an integrated circuit.

The Walsh function correlation processor can be implemented using a field programmable gate array, although the detailed implementation technique is not relevant. Field programmable gate array implementations are facilitated by the tree structure because the higher fanout routes of such an implementation, being longer, can operate more slowly. Alternatively, the processor can be implemented entirely in software executed by a digital signal processing microprocessor. For high bandwidths, the processor can be efficiently implemented using a charge-transfer device (CTD).

Charge-Transfer Device Implementation

Charge-transfer devices (CTD) include charge-coupled devices (CCD), acoustic-charge-transfer (ACT) devices, and bucket-brigade devices (BBD). Each of these technologies represent signals as electronic charge, and process the signals by manipulating electronic charge. CTD technologies can perform both synchronization and demodulation. A CTD can take discrete-time analog samples at its input, perform all the signal processing, and provide the resulting digital data decisions at its output. Since the CTD input is a capacitive storage cell, the analog signal is inherently sampled as the CTD input is clocked. This operation is similar to the sampling capacitor in a sample and hold circuit.

Alternatively, a digital approach requires high speed D/A converters that are costly. By contrast, the input linearity of a CTD supports far more processing gain than is needed for this application, at sampling rates of 50 Msps for CCD devices to 360 Msps for ACT devices. These sampling rates include a factor-of-two oversampling, relative to the signal bandwidth, to prevent excessive straddling loss. Higher sampling rates are possible by operating two devices in parallel and staggering the clocks. The signal can be processed with analog precision against the binary digital reference signal.

A Walsh demodulator can be configured using a CTD 190, as shown schematically in an exemplary embodiment in FIG. 18. The electrical input to a CCD 190 is connected to signal charge injection wire 191 which is bonded to the surface of the substrate at input electrode 192. A clock signal on the clocking electrodes 195 transfers the sampled charge packet serially along the row of charge storage cells 193. After each clock period, during which period, each charge storage cell receives the charge packet previously stored in the charge storage cell to its left, the signal sensing electrodes 194 read the level of charge stored in each cell.

Alternatively, in an ACT, signal samples are handled similarly, but the clocking electrodes of the CCD are replaced by the electric potential of a traveling surface acoustic wave. In a BBD, the clocking of signal charge is effected via clocked pass transistors, but the signal treatment is analogous.

A Walsh demodulator requires sample delays for providing storage of waveform samples, as is provided in the charge storage cell 193 that is within the substrate beneath the clocking electrodes 195, and beneath the signal sensing electrodes 194. Walsh combination circuits 198 perform Walsh correlations on signals provided by the signal sensing electrodes 194, thereby providing a plurality of envelope outputs. Then, a magnitude circuit and M-way compare circuit 200 provide a largest magnitude index signal 201 indicating which correlator of the Walsh combination circuits 198 yielded an envelope output having the largest magnitude. The largest magnitude index signal 201 is provided to a detect/data decode circuit 202 which performs data demodulation upon the signal.

If the PN-DSSS code is of a higher bandwidth than the CTD can support, the bandwidth of the received signal can be reduced before being processed by the CTD by removing the PN-DSSS modulation in a pre-correlator, after DS chip timing has been established during the synchronization cycle. The CTD can then performing Walsh correlations, data demodulation, and data decoding.

Establishing synchronization can also be performed in the CTD, either by a reconfiguration of the demodulation CTD channels, or by a separate CTD channel operating in parallel. If the same chip rate is preferred for both synchronization and demodulation, and if the preferred chip rate is higher than 25 MHz (for a 50 Msps device), parallel CCDs may be used, combined with a multiplexing structure to implement a matched filter.

Alternatively, the ACT technology could be used because of its higher inherent sampling rates. As another alternative, since there is no baud rate requirement for synchronization, a longer symbol can be used with a lower PN-DSSS code rate, thereby preserving processing gain.

The number of code chips in the matched filter can be further increased so as to provide a robust synchronization preamble. Precise timing can then be achieved in a sequential operation. In this way, for example, a spread spectrum code rate of 25 Mhz can be used for synchronization, while a Walsh chip rate of 25 Mhz can be used to encode data modulated by a 75 Mhz spread spectrum code that can be removed in the pre-correlator.

An important advantage of CTDs is that all associated support circuits and the storage cells can be integrated on the same device. Since modern CCDs use storage that resembles a dynamic RAM, CCD technology has benefitted directly from advances in packing density and speed of DRAM technology.

The magnitude and 8-way compare circuit 200 and the detection and data decode circuit 202, (and optionally timing and frequency control loops), for example, are integratable directly on the device output, thereby greatly simplifying output processing.

Digital Implementation

The chip architecture is based on the basic cell and tree structure of FIGS. 22 and 23. This architecture is efficiently achieved as in an integrated circuit (IC) or as a field programmable gate array (FPGA), since it is register-intensive and tree-like in form. A benefit of the tree architecture is that, even thought each stage includes the twice the amount of circuitry as its preceding stage, the later stage is only required to operate at half the speed of its preceding stage. The power distribution on the chip is thereby evenly distributed, and routing requirements of the most speed-intensive circuits are reduced. Consequently, the higher-speed input stages can use optimized routing. Also, the last stage, which operates relatively slowly and which requires many routing channels due to having the highest adder fanout, can be placed without constraint.

Communication over a non-Gaussian communications channel requires that a digital signal processor receive a wider input word than communication over a Gaussian communications channel. In a Gaussian channel, good signal normalization can be used to reduce the number of bits per input word to as low as one, thereby providing substantial hardware savings.

With reference to FIG. 19, to accommodate non-Gaussian interference, and to reduce the accuracy required of the signal normalization circuits (e.g., automatic gain control), the embodiment of FIG. 19 uses 6 bit per word input samples 206 (5 bits plus a sign bit). A series of clock signal dividers 205 provides progressively slower clock signals. The input samples 206 are clocked into an input register 207. The first stage add/sub module 208, shown in detail in FIG. 19A, operates on the six-bit two's-complement input 209 with sign extension to produce a seven bit output 211.

To support 10 Mbps 8-ary signalling, the add/sub block 208 must operate at a 26.67 MHz clock rate. This is because a symbol rate of 3.333 Msps (million symbols per second) is required with eight Walsh chips/symbol (for 8-ary modulation) to achieve 10 Mbps with 3 bits/symbol.

Referring to FIG. 9A, clock signal A is twice the speed of clock signal B, having been divided by a factor of two by a clock signal divider 205. Consequently, an adder 210A and a subtractor 210B operate in parallel to provide a pair of outputs at a rate that is half the rate that input samples are presented to the add/subtract module 208.

Clocking

After a pair of input samples are loaded into an input register 208A of the first add/subtract module 208, the results of adding and subtracting operations performed by modules 210A and 210B, respectively, are latched out upon the arrival of the next input sample. Thus, even though the add/subtract module 208 operates on a pair of samples at a time, the result must be ready in a single sample time. Similarly, the second stage Add/Sub blocks 212 operate on a pair of output samples 211 of the first stage Add/Sub block 208. The results must be latched out to the next stage before next input samples arrive.

The third stage add/subtract modules 214 have been modified so that the output register 216 is placed after the 8-way compare 218, thereby eliminating an extra frame delay, as well as eliminating M−1 registers (where M=8, in this example). The third stage add/subtract modules 214, and the 8-way compare circuit 218, operates at one fourth the input rate. If double buffering were used at the input to each stage, the computation rates would be halved, because an extra set of samples would be stored while awaiting processing.

There is typically some skew (delay) between the arrival of the clock signals at the latches of the inputs and the outputs of each stage. The difference between the latest arrival time of the input clock to the earliest arrival of the output clock, if positive, must be added to the maximum delay path of the logic to determine clocking rate. Excess delay may be added to the output clock to increase the speed, provided care is taken that minimum hold times are met for the shortest possible logic delay path.

The 8-way compare circuitry 218 is shown as an inverted binary tree structure having one half as many elements in each successive stage as in a previous stage. Since a single receiver channel is shown, the coherent carrier reference case is assumed, as shown in FIG. 14. Thus, envelope detection is just a sign stripping function. First, the magnitude of each nine-bit envelope signal from the add/subtract modules 214 is determined in the sign-strip modules 220. Then, magnitude comparisons are performed in pairwise fashion at each stage resulting in a single magnitude, of the largest byte, from a winning correlator. The value of the largest byte of each comparison is passed along to the next stage, while the index of the corresponding correlator is interpreted by the 7-to-3 decoder 222 as the orthogonal data demodulation result.

Architecture for Full I and Q Processing

In FIG. 20, the pipelined architecture described in FIG. 19 is duplicated for the Q channel, wherein the circuitry for the I and Q channels are combined, with the 8-way compare circuitry, to provide full I and Q processing. FIG. 20 shows how quadrature-channel combining is performed, using the well-known approximation of adding the output of the largest value of the I 230 or Q 231 channels on each output pair to one half the output of the smaller value, in the combine I and Q blocks 232. Therefore, the sign stripping, as performed by a sign strip module 220, is still necessary on each channel.

According to the invention, the circuitry of FIG. 20 can be partitioned so as to provide a plurality of identical or nearly identical integrated circuits, the integrated circuits each being a cascadable structure suitable for combining with similar integrated circuits to form M-ary Walsh demodulators of arbitrary values of M.

The most direct way of accomplishing this partitioning, such that it becomes possible to partition the circuitry of FIG. 20 into FPGA chips, or into multiple custom or semicustom integrated circuits, is to place a single Walsh correlator on each chip. Additionally, the I and Q combining circuits are placed on a third chip that also includes 8-way compare circuitry. This approach to partitioning requires that each Walsh correlator chip include 64 output lines (8 bits by 8 channels), and that the combiner chip include 128 input lines. This amount of I/O is excessive, resulting in high cost and reduced reliability.

Referring to FIGS. 21A and 21B, the partitioning approach taught by the invention is to divide the circuitry into an upper segment 240, shown in FIG. 21A, and a lower segment 242, shown in FIG. 21B, keeping the I channel 244 and Q channel 246 of each segment together on the same chip. The upper and lower segments 240 and 242 are not connected until after the final comparison of the comparison tree 248. The upper segment circuits 240 can be placed on one chip, and the lower segment circuits 242 can be placed on another chip. Only twenty four data lines are required to connect the two chips.

In the 8-ary circuitry shown in FIGS. 21A and 21B, after the first stage, seven lines in each of the I and Q channels are for interfacing to the other chip, and four complex correlators (244, 246) are included on a chip. The four I and four Q correlators (244, 246) on each chip are identical to those in FIG. 20, but relate to only half the tree structure shown in FIG. 20. After the four I and Q results are combined on each chip, they are reduced to a single largest value in a 4-way compare module 248. This largest value (an 8-bit amplitude), along with two decoding lines, is exported to the other chip where it is compared to the result from the other half of the comparison tree, whereupon the largest of the two values is decoded. The result is a three bit word representing a demodulated symbol.

The circuitry may be further subdivided by parsing each section 240, 242 similarly into two smaller chips. Similarly, the chips may be cascaded in the case of higher order alphabets, i.e, higher values of M. It is also possible to form a more symmetric partitioning by having one chip serve as a front-end source that feeds individual segments of the tree.

For improved operating speed, necessary for higher alphabets, the number of signal lines between chips can be traded against speed of a speed-optimized front end. The symmetric front-end source is obtained by splitting the first stage Add/Sub block with the sum output feeding the upper segment and the difference output feeding the lower segment. A single input line can determine whether that stage is an adder or subtractor.

This approach allows use of multiple FPGA technology chips, or the use of multiple custom or semicustom integrated circuits, while maintaining modest size and interconnect complexity in each chip to increase yield and reliability. This approach allows a single chip of common circuits to be cascaded vertically and horizontally by a user to create arbitrarily large alphabets.

Other modifications and implementations will occur to those skilled in the art without departing from the spirit and the scope of the invention as claimed. Accordingly, the above description is not intended to limit the invention except as indicated in the following claims.

What is claimed is:

1. An apparatus for communicating data between at least two data devices, the apparatus comprising:
   (a) means for acquiring data from a data device;
   (b) means for representing the data as a sequence of digital waveform symbols, the digital waveform symbols being selected from a set that includes more than two unique digital waveform symbols each digital waveform symbol being characterized by a symbol duration, wherein each of the unique digital waveform symbols is orthogonal with respect to each other unique digital waveform symbol in the set, and further wherein the means for representing the data as a sequence of digital waveform symbols includes:
      (I) means for grouping the data into a sequence of groups of N bits each, each group representing a symbol selected from $2^N$ possible data symbols; and
      (ii) data modulation means for representing each data symbol as a digital waveform symbol so as to form the sequence of digital waveform symbols;
   (c) means for generating a direct-sequence spread spectrum encoding signal;
   (d) multiplying means for combining the direct-sequence spread spectrum encoding signal with the sequence of digital waveform symbols to provide a transmit signal;
   (e) modulator means for modulating a carrier signal in accordance with the transmit signal to provide a modulated signal; and
   (f) means for transmitting the modulated signal;
   wherein said apparatus further includes (I) means for applying differential multiphase phase shift keying to each pair of sequentially neighboring waveform symbols so as to produce a waveform modulated by a combination of differential M-ary PSK and M-ary orthogonal function modulation; and (ii) means for applying Reed-Solomon error correction coding to each waveform symbol, and means for applying binary error correction coding to the differential multiphase phase shift keying.

2. The apparatus of claim 1, wherein said means for representing the data represents said data in at least one coding block and said Reed-Solomon coding includes means for correcting only a single error in a coding block and binary coding comprising separate parity bits applied to even and odd groups of a differential bi-phase shift keying data.

3. An apparatus for communicating data between at least two data devices, the apparatus comprising:
   (a) means for acquiring data from a data device;
   (b) means for representing the data as a sequence of digital waveform symbols, the digital waveform symbols being selected from a set that includes more than two unique digital waveform symbols, each digital waveform symbol being characterized by a symbol duration, wherein each of the unique digital waveform symbols is orthogonal with respect to each other unique digital waveform symbol in the set, and further wherein the means for representing the data as a sequence of digital waveform symbols includes:
      (I) means for grouping the data into a sequence of groups of N bits each, each group representing a symbol selected from $2^N$ possible data symbols; and
      (ii) data modulation means for representing each data symbol as a digital waveform symbol so as to form the sequence of digital waveform symbols;
   (c) means for generating a direct-sequence spread spectrum encoding signal;
   (d) multiplying means for combining the direct-sequence spread spectrum encoding signal with the sequence of digital waveform symbols to provide a transmit signal;
   (e) modulator means for modulating a carrier signal in accordance with the transmit signal to provide a modulated signal; and
   (f) means for transmitting the modulated signal;
   further including (I) means for applying multiphase phase shift keying to each waveform symbol so as to produce a waveform modulated by a combination of M-ary PSK and M-ary orthogonal function modulation; (ii) means for applying Reed-Solomon error correction coding to each waveform symbol, and (iii) means for applying binary error correction coding to the multiphase phase shift keying.

4. An apparatus for communicating data between at least two data devices, the apparatus comprising:
   (a) means for acquiring data from a data device;
   (b) means for representing the data as a sequence of digital waveform symbols, the digital waveform symbols being selected from a set that includes more than two unique digital waveform symbols, each digital waveform symbol being characterized by a symbol duration, wherein each of the unique digital waveform symbols is orthogonal with respect to each other unique digital waveform symbol in the set, and further wherein the means for representing the data as a sequence of digital waveform symbols includes:
      (I) means for grouping the data into a sequence of groups of N bits each, each group representing a symbol selected from $2^N$ possible data symbols; and
      (ii) data modulation means for representing each data symbol as a digital waveform symbol so as to form the sequence of digital waveform symbols;
   (c) means for generating a direct-sequence spread spectrum encoding signal;
   (d) multiplying means for combining the direct-sequence spread spectrum encoding signal with the sequence of digital waveform symbols to provide a transmit signal;
   (e) modulator means for modulating a carrier signal in accordance with the transmit signal to provide a modulated signal; and
   (f) means for transmitting the modulated signal;
   wherein the set of digital waveform symbols includes a set of Walsh-function waveforms, and said apparatus further includes means for applying Reed-Solomon error correction coding to each Walsh-function waveform.

5. The apparatus of claim 4, wherein said means for representing the data represents said data in at least one coding block, and said Reed-Solomon coding includes means for correcting only a single error in a coding block.

6. The apparatus of claim 5, further including means for using a coding block that is short enough such that the single error correcting will correct a sufficient number of errors in a data packet so that the packet failure rate will meet system specifications.

7. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:
   means for receiving the modulated signal to provide an incoming signal;
   means for providing a timing signal;
   despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;
   most-likely symbol means for receiving the plurality of despread correlation signals, and determining therefrom a most-likely transmitted digital waveform symbol so as to provide a sequence of received symbols;
   means for converting the most-likely transmitted digital waveform symbol into a digital data bit sequence so as to provide a digital data stream; and
   means for providing the digital data stream to a data device;
   wherein the set of possible digital waveform symbols includes a set of Walsh-function waveforms; and wherein the despreading/correlation means includes:
      means for direct-sequence despreading of a DSSS encoded signal so as to provide a despread signal;
      means for bandpass filtering the despread signal so as to provide a filtered signal having a bandwidth substantially similar to the bandwidth of the set of Walsh-function waveforms;
      means for splitting the filtered signal into an in-phase signal and a quadrature signal;
      means for converting the in-phase signal and the quadrature signal respectively into a digital in-phase signal and a digital quadrature signal;
      Walsh-function demodulator means for correlating the digital signals with the Walsh-function waveforms so as to provide correlated in-phase signals and correlated quadrature signals; and
      means for demodulating the correlated in-phase signals and the correlated quadrature signals so as to provide a plurality of envelope signals,
   wherein the most-likely symbol means includes:
      means for comparing each signal of the plurality of envelope signals so as to determine the largest magnitude envelope signal indicating a Walsh-function waveform most likely to have been transmitted, and for providing a largest magnitude index signal indicative of the largest magnitude envelope signal, and
   wherein the means for converting includes:
      data decoder means for decoding the largest magnitude envelope signal so as to provide a binary data stream.

8. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:
   means for receiving the modulated signal to provide an incoming signal;
   means for providing a timing signal;
   despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;
   most-likely symbol means for receiving the plurality of despread correlation signals, and determining therefrom a most-likely transmitted digital waveform symbol so as to provide a sequence of received symbols;
   means for converting the most-likely transmitted digital waveform symbol into a digital data bit sequence so as to provide a digital data stream; and
   means for providing the digital data stream to a data device;
   wherein said data stream includes at least one data block, and said apparatus further includes means for using a Reed-Solomon error correction for correcting only a single error in a coding block.

9. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:
   means for receiving the modulated signal to provide an incoming signal;
   means for providing a timing signal;
   despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;
   most-likely symbol means for receiving the plurality of despread correlation signals, and determining therefrom a most-likely transmitted digital waveform symbol so as to provide a sequence of received symbols;
   means for converting the most-likely transmitted digital waveform symbol into a digital data bit sequence so as to provide a digital data stream; and means for providing the digital data stream to a data device;

wherein the despreading/correlation means further includes means for providing a largest complex amplitude signal, the most-likely symbol means further includes means for providing a largest magnitude index signal, and the apparatus further comprises:

means, responsive to the largest complex amplitude signal and to the largest magnitude index signal, for binary DPSK demodulating the sequence of received symbols.

10. The apparatus of claim 9, wherein the apparatus further includes:

means for Reed-Solomon error correction decoding and means for binary error decoding.

11. The apparatus of claim 10, wherein said data stream includes at least one data block, and said apparatus further includes means for using a Reed-Solomon error correction for correcting only a single error in a coding block and erasure decoding of the binary stream.

12. The apparatus of claim 11, wherein the erasure decoding includes means for using separate parity bits applied to the even and the odd groups of a differential bi-phase shift keying data for the correction.

13. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:

means for receiving the modulated signal to provide an incoming signal;

means for providing a timing signal;

despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;

most-likely symbol means for receiving the plurality of despread correlation signals, and determining therefrom a most-likely transmitted digital waveform symbol so as to provide a sequence of received symbols;

means for converting the most-likely transmitted digital waveform symbol into a digital data bit sequence so as to provide a digital data stream; and means for providing the digital data stream to a data device;

wherein the despreading/correlation means also provides a largest complex amplitude signal, the most-likely symbol means further includes means for providing a largest magnitude index signal, and the apparatus further comprises:

means, responsive to the largest complex amplitude signal and to the largest magnitude index signal, for M-ary DPSK demodulation of the sequence of received symbols.

14. The apparatus of claim 13, wherein the apparatus further includes:

means for error correction decoding.

15. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:

means for receiving the modulated signal to provide an incoming signal;

means for providing a timing signal;

despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;

most-likely symbol means for receiving the plurality of despread correlation signals, and determining therefrom a most-likely transmitted digital waveform symbol so as to provide a sequence of received symbols;

means for converting the most-likely transmitted digital waveform symbol into a digital data bit sequence so as to provide a digital data stream; and means for providing the digital data stream to a data device;

wherein the set of possible digital waveform symbols includes a set of Walsh-function waveforms, and the despreading/correlation means includes:

means for bandpass filtering the incoming signal so as to provide a filtered signal having a bandwidth substantially similar to the bandwidth of the set of Walsh-function waveforms with DSSS encoding;

means for splitting the filtered signal into an in-phase signal and a quadrature signal;

means for converting the in-phase signal and the quadrature signal respectively into an in-phase digital signal and a quadrature digital signal;

means for direct-sequence despreading each digital signal and correlating each digital signal with the Walsh-function waveforms so as to provide despread correlated in-phase signals and despread correlated quadrature signals; and means for demodulating the despread correlated in-phase signals and the despread correlated quadrature signals so as to provide a plurality of envelope signals, wherein the most-likely symbol means includes:

means for comparing each signal of the plurality of envelope signals so as to determine the largest magnitude envelope signal indicating a Walsh-function waveform most likely to have been transmitted, and for providing a largest magnitude index signal indicative of the largest magnitude envelope signal, and wherein the means for converting includes:

data decoder means for decoding the largest magnitude envelope signal so as to provide a binary data stream.

16. The apparatus of claim 15, wherein the despreading/correlation means further includes means for providing a largest complex amplitude signal, the most-likely symbol means further includes means for providing a largest magnitude index signal, and the apparatus further comprises:

means, responsive to the largest complex amplitude signal and to the largest magnitude index signal, for binary DPSK demodulating the sequence of received symbols.

17. The apparatus of claim 16, wherein the apparatus further includes:
    means for Reed-Solomon error correction decoding and means for binary error decoding.

18. The apparatus of claim 17, wherein said data stream includes at least one data block, and said apparatus further includes means for using a Reed-Solomon error correction for correcting only a single error in a coding block and erasure decoding of the binary stream.

19. The apparatus of claim 18, wherein the erasure decoding includes means for using separate parity bits applied to the even and the odd groups of a differential bi-phase shift keying data for the correction.

20. The apparatus of claim 15, wherein the despreading/correlation means also provides a largest complex amplitude signal, the most-likely symbol means further includes means for providing a largest magnitude index signal, and the apparatus further comprises:
    means, responsive to the largest complex amplitude signal and to the largest magnitude index signal, for M-ary DPSK demodulation of the sequence of received symbols.

21. The apparatus of claim 20, wherein the apparatus further includes:
    means for error correction decoding.

22. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:
    means for receiving the modulated signal to provide an incoming signal;
    means for providing a timing signal;
    despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;
    most-likely symbol means for receiving the plurality of despread correlation signals, and determining therefrom a most-likely transmitted digital waveform symbol so as to provide a sequence of received symbols;
    means for converting the most-likely transmitted digital waveform symbol into a digital data bit sequence so as to provide a digital data stream; and
    means for providing the digital data stream to a data device;
    wherein the set of possible digital waveform symbols includes a set of Walsh-function waveforms, and wherein the despreading/correlation means includes:
        a Walsh-function correlator, for receiving an input sample sequence, the correlator including a plurality of basic cells, each basic cell having an input and two outputs, the cells being interconnected to form a binary tree structure such that each possible path through the tree structure represents a unique function upon the input sequence, thereby providing a plurality of output sample sequences.

23. The apparatus of claim 22, wherein each basic cell accepts the input sample sequence serially at a first rate $f_{in}$, and generates first and second output sample sequences in parallel at a second rate $f_{in}/2$, such that the first output sample sequence includes the sum of a current serial pair of input samples of the input sample sequence, and the second output sample sequence includes the difference of the current serial pair of input samples of the input sample sequence, wherein each output sample sequence can be provided as an input sample sequence to another basic cell.

24. The apparatus of claim 22, wherein the tree structure is partitioned into a plurality of circuit segments for fabrication as a plurality of individual integrated circuit chips,
    wherein each circuit segment includes an in-phase channel and a quadrature channel of at least a subset of the set of Walsh-function correlators disposed on the same integrated circuit chip, and
    wherein each integrated circuit chip includes means for receiving output signals from a plurality of chips so as to perform a full set of Walsh-function correlations, thereby demodulating the received modulated signal.

25. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:
    means for receiving the modulated signal to provide an incoming signal;
    means for providing a timing signal;
    despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;
    most-likely symbol means for receiving the plurality of despread correlation signals, and determining therefrom a most-likely transmitted digital waveform symbol so as to provide a sequence of received symbols;
    means for converting the most-likely transmitted digital waveform symbol into a digital data bit sequence so as to provide a digital data stream; and
    means for providing the digital data stream to a data device;
    wherein the set of possible digital waveform symbols includes a set of Walsh-function waveforms, and the despreading/correlation means includes:
        means for pseudonoise despreading of a DSSS encoded signal so as to provide a despread signal;
        means for bandpass filtering the despread signal so as to provide a filtered signal having a bandwidth substantially similar to the bandwidth of the set of Walsh-function waveforms;
        means for heterodyning to baseband the filtered signal with a coherent phase reference signal so as to provide an in-phase signal;
        means for converting the in-phase signal into a digital in-phase signal;
        Walsh-function demodulator means for correlating the digital signal with a set of Walsh-function waveforms so as to provide a plurality of correlated in-phase signals; and
        means for demodulating the correlated in-phase signals so as to provide a plurality of in-phase envelope signals, wherein the most-likely symbol means includes:
means for comparing each signal of the plurality of in-phase envelope signals so as to determine the largest magnitude in-phase envelope signal indicating a Walsh-function waveform most likely to have been transmitted, and for providing a largest magnitude index signal indicative of the largest magnitude envelope signal, and
wherein the means for converting includes:
data decoder means for decoding the largest magnitude envelope signal so as to provide a binary data stream.

26. The apparatus of claim 25, the apparatus further comprising:
means, responsive to the largest magnitude envelope signal and to the largest magnitude index signal, for M-ary PSK demodulating the sequence of received symbols.

27. The apparatus of claim 26, further including means, responsive to the most-likely symbol means, for performing error correction decoding on the most-likely symbol if the most-likely symbol has been error-correction-encoded.

28. The apparatus of claim 25, the apparatus further comprising:
means, responsive to the largest magnitude envelope signal and to the largest magnitude index signal, for binary PSK demodulating the sequence of received symbols.

29. The apparatus of claim 28, wherein the means for converting the most-likely transmitted digital waveform symbol into a digital data sequence includes means for Reed-Solomon error correction decoding and means for binary error decoding.

30. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:
means for receiving the modulated signal to provide an incoming signal;
means for providing a timing signal;
despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;
most-likely symbol means for receiving the plurality of despread correlation signals, and determining therefrom a most-likely transmitted digital waveform symbol so as to provide a sequence of received symbols;
means for converting the most-likely transmitted digital waveform symbol into a digital data bit sequence so as to provide a digital data stream; and
means for providing the digital data stream to a data device;
wherein the set of possible digital waveform symbols includes a set of Walsh-function waveforms, and the despreading/correlation means includes:
means for bandpass filtering the incoming signal so as to provide a filtered signal having a bandwidth substantially similar to the bandwidth of the set of Walsh-function waveforms with DSSS encoding;
means for heterodyning to baseband the filtered signal with a coherent phase reference signal so as to provide an in-phase signal;
means for converting the in-phase signal into an in-phase digital signal;
means for direct-sequence despreading the digital signal and correlating the digital signal with a Walsh-function waveform so as to provide a despread Walsh in-phase signal; and
means for envelope demodulating the despread Walsh in-phase signal so as to provide a plurality of envelope signals,
wherein the most-likely symbol means includes:
means for comparing each signal of the plurality of envelope signals so as to determine the largest magnitude envelope signal indicating a Walsh-function waveform most likely to have been transmitted, and for providing a largest magnitude index signal indicative of the largest magnitude envelope signal, and
wherein the means for converting includes:
data decoder means for decoding the largest magnitude envelope signal so as to provide a binary data stream.

31. The apparatus of claim 30, the apparatus further comprising:
means, responsive to the largest magnitude envelope signal and to the largest magnitude index signal, for binary PSK demodulating the sequence of received symbols.

32. The apparatus of claim 31, wherein the means for converting the most-likely transmitted digital waveform symbol into a digital data sequence includes means for Reed-Solomon error correction decoding and means for binary error decoding.

33. The apparatus of claim 30, the apparatus further comprising:
means, responsive to the largest magnitude envelope signal and to the largest magnitude index signal, for M-ary PSK demodulating the sequence of received symbols.

34. The apparatus of claim 33, further including means, responsive to the most-likely symbol means, for performing error correction decoding on the most-likely symbol if the most-likely symbol has been error-correction-encoded.

35. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:
means for receiving the modulated signal to provide an incoming signal;
means for providing a timing signal;
despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;

most-likely symbol means for receiving the plurality of despread correlation signals, and determining therefrom a most-likely transmitted digital waveform symbol so as to provide a sequence of received symbols;

means for converting the most-likely transmitted digital waveform symbol into a digital data bit sequence so as to provide a digital data stream; and means for providing the digital data stream to a data device;

further including a sliding serial-correlator-based synchronizer, having a signal detector, and being responsive to one of the plurality of despread correlation signals, for detecting the presence of the input signal; a time-tracking loop, responsive to the most-likely symbol means, for extracting changes in timing information from at least one signal selected by the most-likely symbol means.

36. Apparatus for receiving data communicated as a modulated signal between at least two data devices, the modulated signal being of the type encoded with direct-sequence spread spectrum encoding, and including digital waveform symbols selected from a set of possible mutually orthogonal digital waveform symbols so that said data can be grouped into and conveyed as a sequence of groups of N bits each, the apparatus comprising:

means for receiving the modulated signal to provide an incoming signal;

means for providing a timing signal;

despreading/correlation means, responsive to the timing signal and to the incoming signal, for both removing the pseudonoise direct-sequence spread spectrum encoding from the incoming signal, and for correlating the incoming signal with each possible digital waveform symbol of said set of possible digital waveform symbols so as to provide a plurality of despread correlation signals;

most-likely symbol means for receiving the plurality of despread correlation signals, and determining therefrom a most-likely transmitted digital waveform symbol so as to provide a sequence of received symbols;

means for converting the most-likely transmitted digital waveform symbol into a digital data bit sequence so as to provide a digital data stream; and means for providing the digital data stream to a data device;

wherein the most-likely symbol means includes an M-way comparator having a plurality of two-way comparators interconnected as an inverted binary tree structure, each two-way comparator being adapted to provide an output amplitude that is the larger of two input amplitudes, and for providing an index of the larger of the two input amplitudes, the M-way comparator being adapted to provide an index indicating the largest of M input amplitudes, and to provide the largest amplitude of the M input amplitudes.

37. The apparatus of claim 36, wherein the inverted binary tree structure is partitioned into a plurality of circuit segments for fabrication as a plurality of individual integrated circuit chips, wherein each circuit segment includes an in-phase channel and a quadrature channel of at least a subset of the set of Walsh-function correlators disposed on the same integrated circuit chip, and wherein each integrated circuit chip includes means for receiving output signals from a plurality of chips so as to perform a full set of Walsh-function correlations, thereby demodulating the received modulated signal.

38. A method of receiving data communicated as a modulated signal between at least two data devices, the modulated signal being of the type encoded with direct-sequence spread spectrum encoding, and including digital waveform symbols selected from a set of possible digital waveform symbols, wherein each digital waveform symbol in the set of possible digital waveform symbols is orthogonal with respect to each other digital waveform symbol in the set, and wherein the data are grouped into a sequence of groups of N bits each, each group representing a symbol from $2_N$ possible data symbols, and each data symbol is represented as a digital waveform symbol so as to form the sequence of digital waveform symbols, the method comprising the steps of:

receiving the modulated signal to provide an incoming signal;

providing a timing signal;

removing the pseudonoise direct-sequence spread spectrum encoding from the incoming signal;

correlating the incoming signal with each possible orthogonal digital waveform symbol of a set of possible digital waveform symbols so as to provide a plurality of despread correlation signals;

receiving the plurality of despread correlation signals, and determining therefrom a most-likely transmitted digital waveform symbol so as to provide a sequence of received symbols;

converting the most-likely transmitted digital waveform symbol into a digital data sequence so as to provide a digital data stream; and providing the digital data stream to a data device;

wherein the set of possible digital waveform symbols includes a set of Walsh-function waveforms; and the step of removing includes the steps of:

direct-sequence despreading of a DSSS encoded signal so as to provide a despread signal;

bandpass filtering the despread signal so as to provide a filtered signal having a bandwidth substantially similar to the bandwidth of the set of Walsh-function waveforms;

splitting the filtered signal into an in-phase signal and a quadrature signal; and converting the in-phase signal and the quadrature signal respectively into a digital in-phase signal and a digital quadrature signal, wherein the step of correlating includes the steps of:

correlating each digital signal with a Walsh-function waveform so as to provide a in-phase signal and a quadrature signal; and envelope demodulating the in-phase signal and the quadrature signal so as to provide a plurality of envelope signals, wherein the step of receiving the plurality of despread correlation signals and determining therefrom a most-likely transmitted digital waveform symbol includes the steps of:

comparing each signal of the plurality of envelope signals so as to determine the largest magnitude envelope signal indicating a Walsh-function waveform most likely to have been transmitted; and providing a largest magnitude index signal indicative of the largest magnitude envelope signal, and wherein the step of converting includes the step of:
  decoding the largest magnitude envelope signal so as to provide a binary data stream.

39. The method of claim 38, further comprising the step of:
  M-ary DPSK demodulating the sequence of received symbols.

40. A method of receiving data communicated as a modulated signal between at least two data devices, the modulated signal being of the type encoded with direct-sequence spread spectrum encoding, and including digital waveform symbols selected from a set of possible digital waveform symbols, wherein each digital waveform symbol in the set of possible digital waveform symbols is orthogonal with respect to each other digital waveform symbol in the set, and wherein the data are grouped into a sequence of groups of N bits each, each group representing a symbol from $2_N$ possible data symbols, and each data symbol is represented as a digital waveform symbol so as to form the sequence of digital waveform symbols, the method comprising the steps of:
  receiving the modulated signal to provide an incoming signal;
  providing a timing signal;
  removing the pseudonoise direct-sequence spread spectrum encoding from the incoming signal;
  correlating the incoming signal with each possible orthogonal digital waveform symbol of a set of possible digital waveform symbols so as to provide a plurality of despread correlation signals;
  receiving the plurality of despread correlation signals, and determining therefrom a most-likely transmitted digital waveform symbol so as to provide a sequence of received symbols;
  converting the most-likely transmitted digital waveform symbol into a digital data sequence so as to provide a digital data stream; and
  providing the digital data stream to a data device;
  wherein the set of possible digital waveform symbols includes Walsh-function waveforms; and the step of removing includes the steps of:
    bandpass filtering the incoming so as to provide a filtered signal having a bandwidth substantially similar to the bandwidth of the set of Walsh-function waveforms with DSSS encoding;
    splitting the filtered signal into an in-phase signal and a quadrature signal;
    converting the in-phase signal and the quadrature signal respectively into a digital in-phase signal and a digital quadrature signal; and
    direct-sequence despreading each digital signal so as to provide a despread in-phase digital signal and a despread quadrature digital signal;
  wherein the step of correlating includes the steps of:
    correlating each digital signal with a Walsh-function waveform so as to provide a in-phase signal and a quadrature signal; and
    envelope demodulating the in-phase signal and the quadrature signal so as to provide a plurality of envelope signals,
  wherein the step of receiving the plurality of despread correlation signals and determining therefrom a most-likely transmitted digital waveform symbol includes the steps of:
    comparing each signal of the plurality of envelope signals so as to determine the largest magnitude envelope signal indicating a Walsh-function waveform most likely to have been transmitted; and
    providing a largest magnitude index signal indicative of the largest magnitude envelope signal,
  and wherein the step of converting includes the step of:
    decoding the largest magnitude envelope signal so as to provide a binary data stream.

41. The method of claim 39, further comprising the step of:
  M-ary DPSK demodulating the sequence of received symbols.

42. Apparatus for receiving data communicated as a modulated signal between at least two data devices, the modulated signal being of the type encoded with direct-sequence spread spectrum encoding, and including digital waveform symbols selected from a set of possible mutually-orthogonal digital waveform symbols so that said data can be grouped into and conveyed as a sequence of groups of N bits each, the apparatus comprising:
  means for receiving the modulated signal to provide an incoming signal;
  means for providing a timing signal;
  despreading/correlation means, responsive to the timing signal and to the incoming signal, for both removing the direct-sequence spread spectrum encoding from the incoming signal, and for correlating the incoming signal with each possible digital waveform symbol of said set of possible digital waveform symbols so as to provide a plurality of despread correlation signals;
  most-likely symbol means for receiving the plurality of despread correlation signals, and determining therefrom a most-likely transmitted digital waveform symbol so as to provide a sequence of received symbols;
  means for converting the most-likely transmitted digital waveform symbol into a digital data bit sequence so as to provide a digital data stream; and
  means for providing the digital data stream to a data device;
  wherein the set of possible digital waveform symbols includes a set of Walsh-function waveforms, and the despreading/correlation means includes:
    means for bandpass filtering the incoming signal so as to provide a filtered signal having a bandwidth substantially similar to the bandwidth of the set of Walsh-function waveforms;
    means for heterodyning to baseband the filtered signal with a coherent phase reference signal so as to provide an in-phase signal;
    means for converting the in-phase signal into a digital in-phase signal;
    means for despreading one of said incoming, filtered, in-phase and digital in-phase signals resulting in a despread digital in-phase signal following conversion of the in-phase signal into a digital in-phase signal;
  Walsh-function demodulator means for correlating the despread digital in-phase signal with a set of Walsh-function waveforms so as to provide correlated in-phase signals; and
  means for demodulating the correlated in-phase signals so as to provide a plurality of in-phase envelope signals,
  wherein the most-likely symbol means includes:

means for comparing each signal of the plurality of in-phase envelope signals so as to determine the largest magnitude in-phase envelope signal indicating a Walsh-function waveform most likely to have been transmitted, and for providing a largest magnitude index signal indicative of the largest magnitude in-phase envelope signal, and wherein the means for converting includes:
data decoder means for decoding the largest magnitude in-phase envelope signal so as to provide a binary data stream.

43. Apparatus according to claim 41, further including means for determining the polarity of the largest magnitude envelope signal.

44. Apparatus according to claim 41,
wherein the despreading/correlation means further includes:
means for heterodyning to baseband the filtered signal with a coherent phase reference signal so as to provide a quadrature-phase signal;
means for converting the quadrature-phase signal into a digital quadrature-phase signal;
means for despreading one of said incoming, filtered, quadrature-phase and digital quadrature-phase signals resulting in a despread digital quadrature-phase signal following conversion of the quadrature-phase signal into a digital quadrature-phase signal;
Walsh-function demodulator means for correlating the despread digital quadrature-phase signal with a set of Walsh-function waveforms so as to provide correlated quadrature-phase signals; and
means for demodulating the correlated quadrature-phase signals so as to provide a plurality of quadrature-phase envelope signals; and
wherein the most-likely symbol means further includes:
means for comparing each signal of the plurality of quadrature-phase envelope signals so as to determine the largest magnitude quadrature-phase envelope signal indicating a Walsh-function waveform most likely to have been transmitted, and for providing a largest magnitude index signal indicative of the largest magnitude quadrature-phase envelope signal and wherein the means for converting further includes:
data decoder means for decoding the largest magnitude quadrature-phase envelope signal so as to provide a binary data stream.

45. Apparatus according to claim 43, further including means for determining the polarity of the largest magnitude in-phase envelope signal and for determining the largest magnitude quadrature-phase envelope signal.

46. The apparatus of claim 41, the apparatus further comprising:
means, responsive to the largest magnitude in-phase envelope signal and to the largest magnitude index signal, for M-ary PSK demodulating the sequence of received symbols.

47. The apparatus of claim 45, further including means, responsive to the most-likely symbol means, for performing error correction decoding on the most-likely symbol if the most-likely symbol has been error-correction-encoded.

48. The apparatus of claim 41, the apparatus further comprising:
means, responsive to the largest magnitude in-phase envelope signal and to the largest magnitude index signal, for binary PSK demodulating the sequence of received symbols.

49. The apparatus of claim 47, wherein the means for converting the most-likely transmitted digital waveform symbol into a digital data sequence includes means for Reed-Solomon error correction decoding and means for binary error decoding.

50. Apparatus for receiving data communicated as a modulated signal between at least two data devices, the modulated signal being of the type encoded with direct-sequence spread spectrum encoding, and including digital waveform symbols selected from a set of possible mutually-orthogonal digital waveform symbols so that said data can be grouped into and conveyed as a sequence of groups of N bits each, the apparatus comprising:
means for receiving the modulated signal to provide an incoming signal;
means for providing a timing signal;
correlation means, responsive to the timing signal and to the incoming signal, for correlating the incoming signal with each possible digital waveform symbol of said set of possible digital waveform symbols so as to provide a plurality of correlation signals;
most-likely symbol means for receiving the plurality of correlation signals, and determining therefrom a most-likely transmitted digital waveform symbol so as to provide a sequence of received symbols;
means for converting the most-likely transmitted digital waveform symbol into a digital data bit sequence so as to provide a digital data stream; and
means for providing the digital data stream to a data device;
wherein the set of possible digital waveform symbols includes a set of Walsh-function waveforms encoded with direct-sequence spread spectrum encoding, and the correlation means includes:
means for bandpass filtering the incoming signal so as to provide a filtered signal having a bandwidth substantially similar to the bandwidth of the set of Walsh-function waveforms;
means for heterodyning to baseband the filtered signal with a coherent phase reference signal so as to provide an in-phase signal;
means for converting the in-phase signal into a digital in-phase signal;
Walsh-function demodulator means for correlating the digital in-phase signal with a set of Walsh-function waveforms encoded with direct-sequence spread spectrum encoding so as to provide correlated in-phase signals; and
means for demodulating the correlated in-phase signals so as to provide a plurality of in-phase envelope signals,
wherein the most-likely symbol means includes:
means for comparing each signal of the plurality of in-phase envelope signals so as to determine the largest magnitude in-phase envelope signal indicating a Walsh-function waveform most likely to have been transmitted, and for providing a largest magnitude index signal indicative of the largest magnitude in-phase envelope signal, and
wherein the means for converting includes:
data decoder means for decoding the largest magnitude in-phase envelope signal so as to provide a binary data stream.

51. Apparatus according to claim 49, further including means for determining the polarity of the largest magnitude envelope signal.

52. Apparatus according to claim 49, wherein the correlation means further includes:

means for heterodyning to baseband the filtered signal with a coherent phase reference signal so as to provide a quadrature-phase signal;

means for converting the quadrature-phase signal into a digital quadrature-phase signal;

Walsh-function demodulator means for correlating the digital quadrature-phase signal with a set of Walsh-function waveforms encoded with direct-sequence spread spectrum encoding so as to provide correlated quadrature-phase signals; and means for demodulating the correlated quadrature-phase signals so as to provide a plurality of quadrature-phase envelope signals; and wherein the most-likely symbol means further includes:

means for comparing each signal of the plurality of quadrature-phase envelope signals so as to determine the largest magnitude quadrature-phase envelope signal indicating a Walsh-function waveform most likely to have been transmitted, and for providing a largest magnitude index signal indicative of the largest magnitude quadrature-phase envelope signal and wherein the means for converting further includes:

data decoder means for decoding the largest magnitude quadrature-phase envelope signal so as to provide a binary data stream.

53. Apparatus according to claim 51, further including means for determining the polarity of the largest magnitude in-phase envelope signal and for determining the largest magnitude quadrature-phase envelope signal.

54. The apparatus of claim 49, the apparatus further comprising:

means, responsive to the largest magnitude in-phase envelope signal and to the largest magnitude index signal, for M-ary PSK demodulating the sequence of received symbols.

55. The apparatus of claim 53, further including means, responsive to the most-likely symbol means, for performing error correction decoding on the most-likely symbol if the most-likely symbol has been error-correction-encoded.

56. The apparatus of claim 49, the apparatus further comprising:

means, responsive to the largest magnitude in-phase envelope signal and to the largest magnitude index signal, for binary PSK demodulating the sequence of received symbols.

57. The apparatus of claim 55, wherein the means for converting the most-likely transmitted digital waveform symbol into a digital data sequence includes means for Reed-Solomon error correction decoding and means for binary error decoding.

* * * * *

UNITED STATES PATENT AND TRADEMARK OFFICE
CERTIFICATE OF CORRECTION

| | |
|---|---|
| PATENT NO. | : 5,809,060 |
| DATED | : September 15, 1998 |
| INVENTOR(S) | : John H. Cafarella, Jeffrey H. Fischer |

It is certified that error appears in the above-identified patent and that said Letters Patent is hereby corrected as shown below:

<u>Claim 41, column 42,</u>
Line 11, delete "39" and insert therefor -- 40 --

Signed and Sealed this

Twenty-third Day of October, 2001

*Attest:*

*Attesting Officer*

NICHOLAS P. GODICI
*Acting Director of the United States Patent and Trademark Office*